United States Patent [19]
Kasahara et al.

[11] Patent Number: 4,748,659
[45] Date of Patent: May 31, 1988

[54] CALLING SIGNAL TRANSMISSION APPARATUS

[75] Inventors: Kiyoshi Kasahara; Kenichi Ogawa, both of Yokohama; Kenji Takato, Kawasaki; Shoji Nojiri, Yokohama; Yoshimi Iijima, Shimotsuma; Yasuo Miyazaki, Fukuoka; Mitsutoshi Ayano, Tokyo; Kiyoshi Shibuya, Kawasaki; Atsuo Serikawa, Yokohama, all of Japan

[73] Assignee: Fujitsu Limited, Kawasaki, Japan

[21] Appl. No.: 904,495

[22] Filed: Sep. 8, 1986

Related U.S. Application Data

[63] Continuation-in-part of Ser. No. 738,657, May 28, 1985, abandoned.

[30] Foreign Application Priority Data

May 30, 1984 [JP] Japan .............................. 59-108502
Jul. 3, 1984 [JP] Japan .............................. 59-136555
Sep. 29, 1984 [JP] Japan .............................. 59-203011
Sep. 9, 1985 [JP] Japan .............................. 60-197711

[51] Int. Cl.⁴ ............................................. H04M 19/02
[52] U.S. Cl. ..................................... 379/253; 379/255; 379/375
[58] Field of Search ................. 379/27, 28, 29, 30, 379/31, 32, 255, 253, 252, 377, 166, 379, 382, 418

[56] References Cited

U.S. PATENT DOCUMENTS

| | | | |
|---|---|---|---|
| 4,140,882 | 2/1979 | Regan et al. | 379/418 |
| 4,349,703 | 9/1982 | Chea, Jr. | 379/382 |
| 4,396,805 | 8/1983 | Wagner | 379/382 |
| 4,406,004 | 9/1983 | Hall et al. | 379/253 |
| 4,447,673 | 8/1984 | Elliott et al. | . |
| 4,496,800 | 1/1985 | Young | 379/418 |

Primary Examiner—Stafford D. Schreyer
Attorney, Agent, or Firm—Staas & Halsey

[57] ABSTRACT

In a calling signal transmitting apparatus, a ring trip equipment, including a ring trip detecting circuit for detecting a ring trip signal in response to an off-hook operation of the telephone set during a signal state of an intermittent ringing signal and a loop detecting circuit for detecting a loop signal in response to an off-hook operation of the telephone set during a nonsignal state of the intermittent ringing signal. Also included are a logical OR gate circuit, for providing, as a status signal, a logical sum of the ring trip signal and the loop signal, and a supervising circuit for supervising the status signal. When an incoming call is being received by the telephone set, when the supervising circuit detects an off-hook state in the status signal, the supervising circuit stops the transmission of a ringing signal to the telephone set, and carries out a second supervising operation for supervising the status signal, and, if an on-hook state is detected during the second supervising operation, said supervising circuit again transfers the ringing signal to the telephone set.

22 Claims, 24 Drawing Sheets

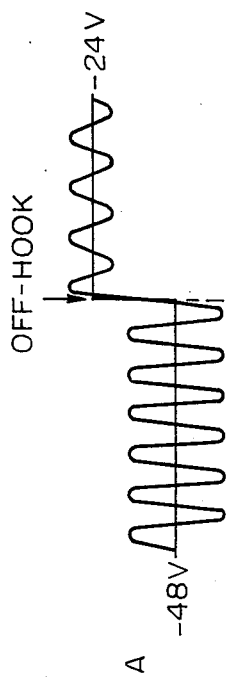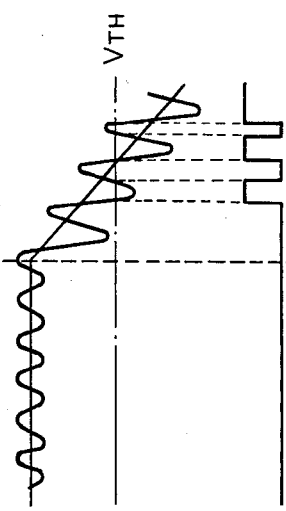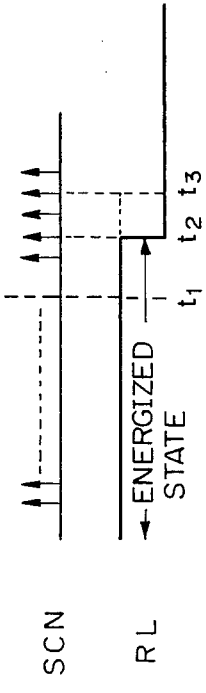
Fig. 5A
Fig. 5B
Fig. 5C
Fig. 5D
Fig. 5E

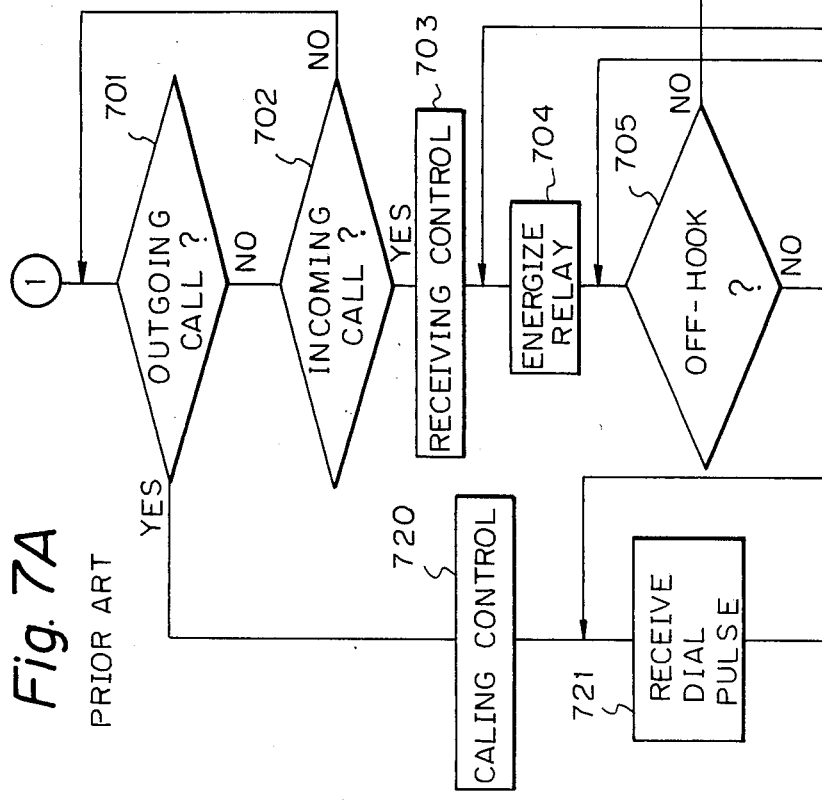

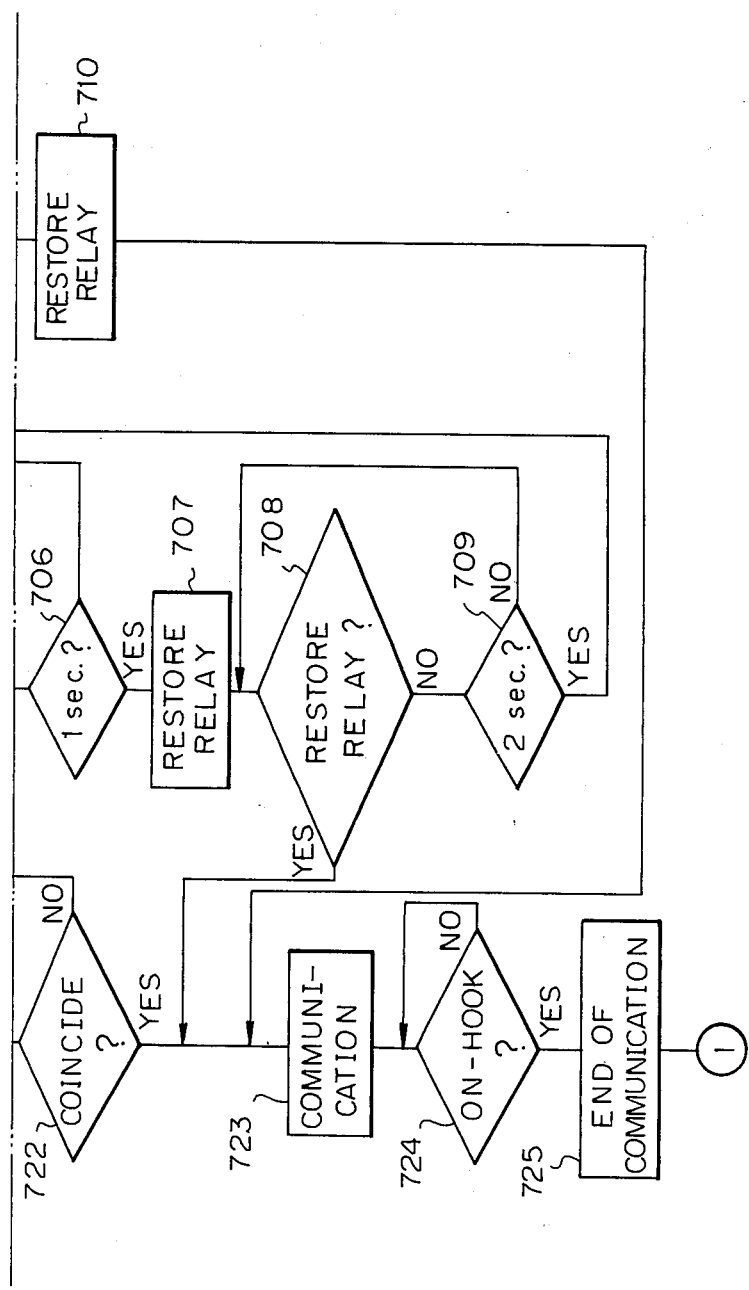

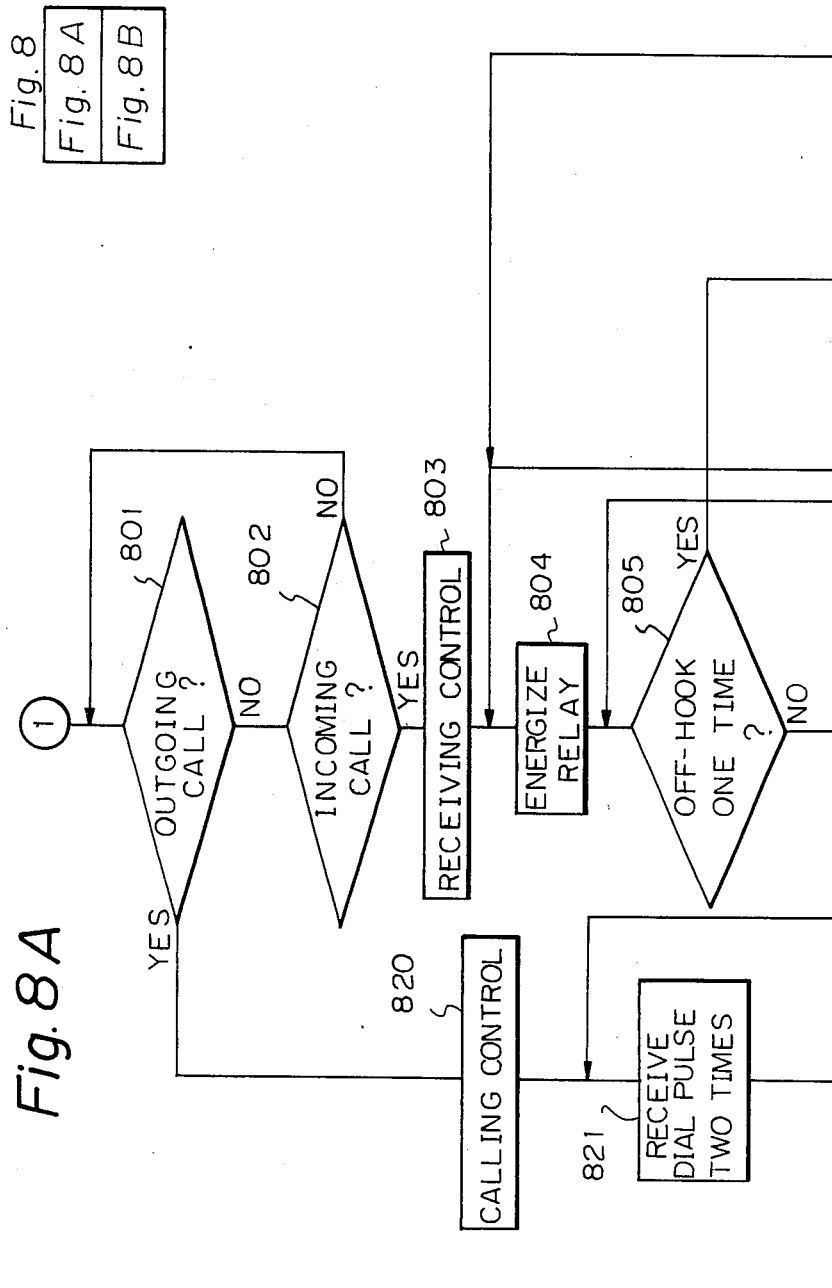

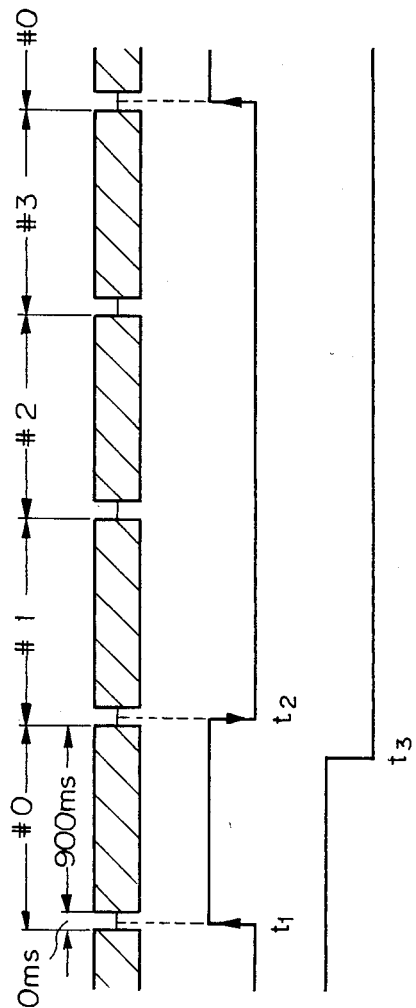
Fig.9A CR
Fig.9B RGPO
Fig.9C IR
Fig.9D SD
Fig.9E HK
PRIOR ART

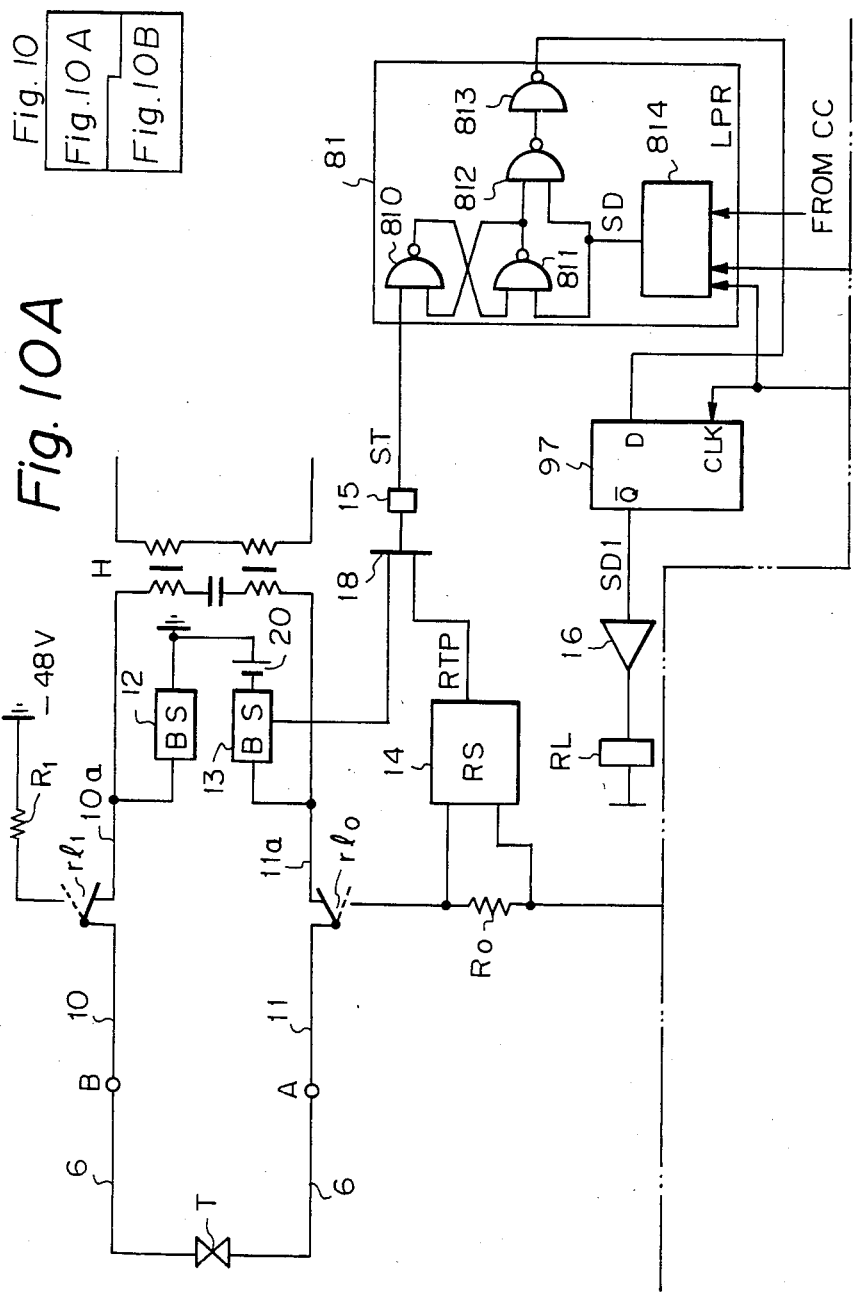

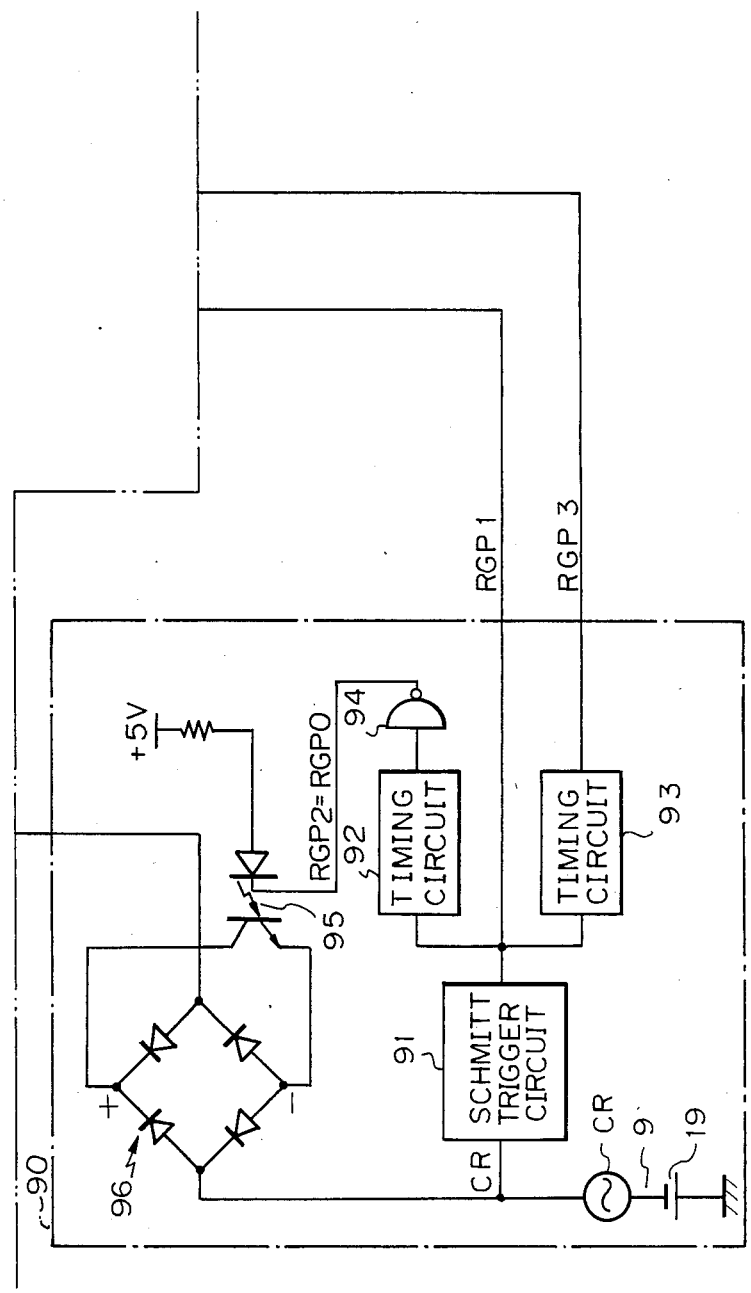

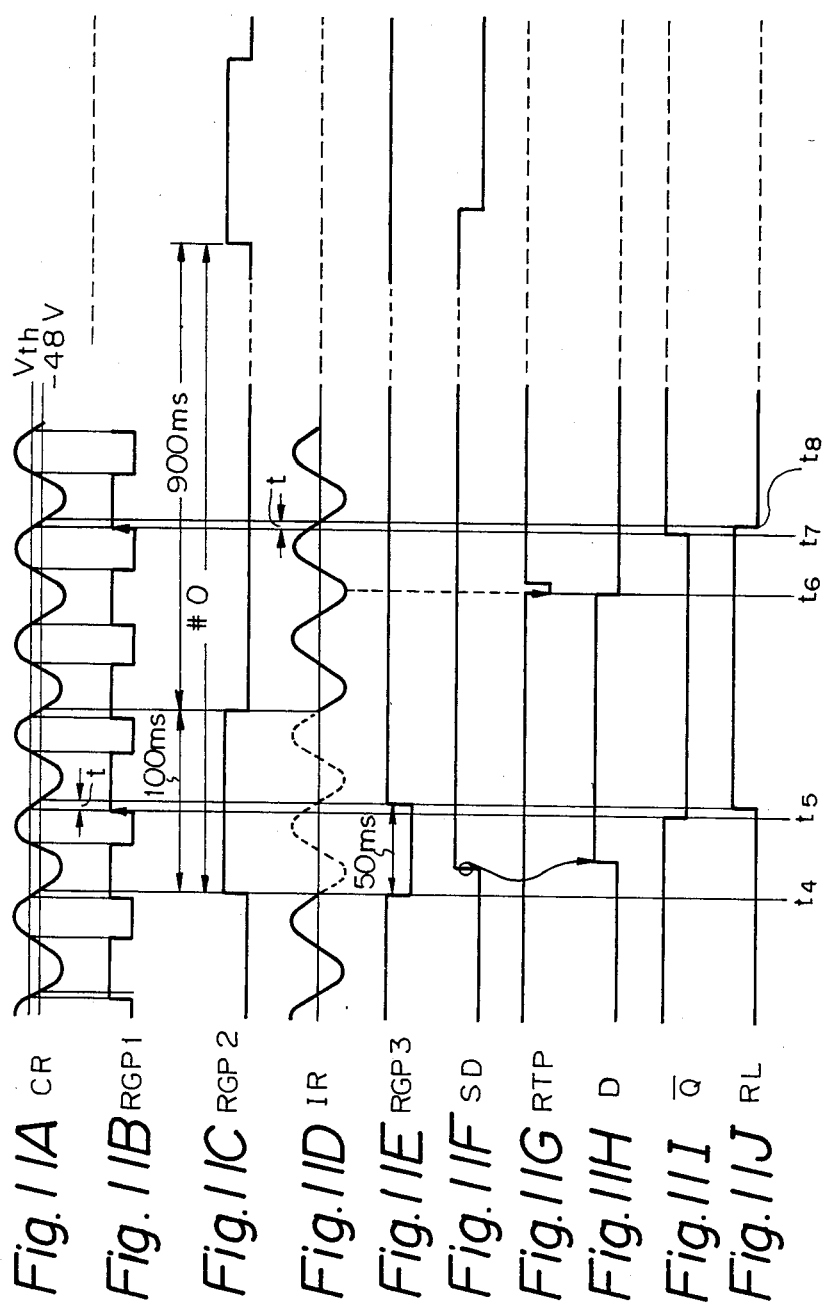

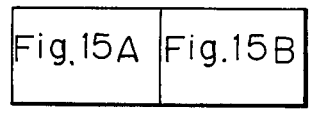
*Fig. 15A*
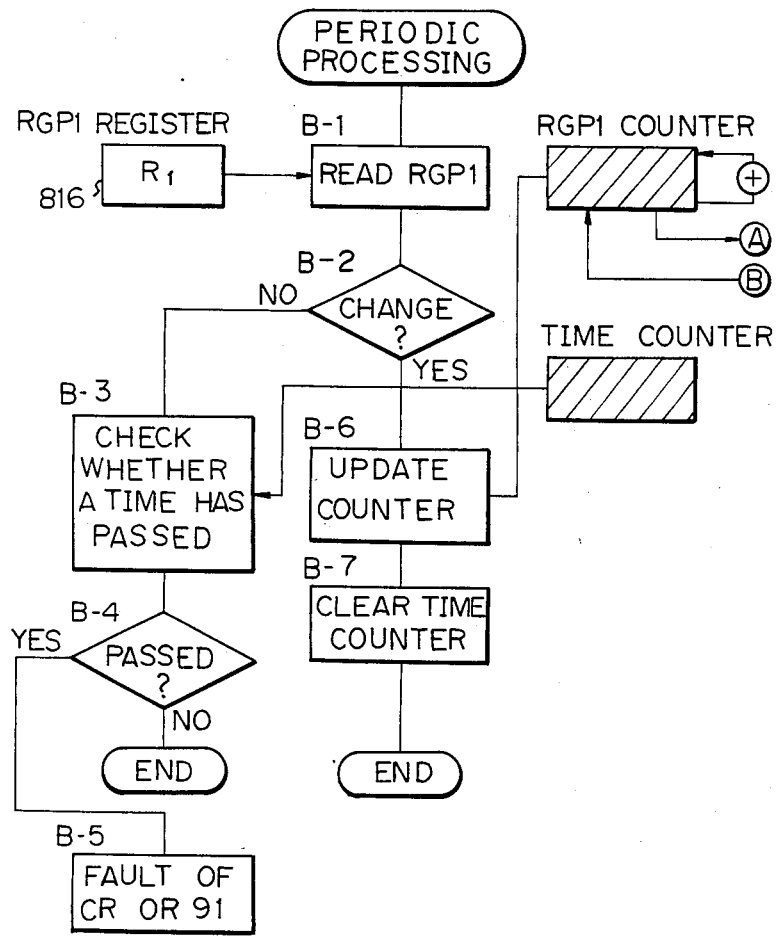

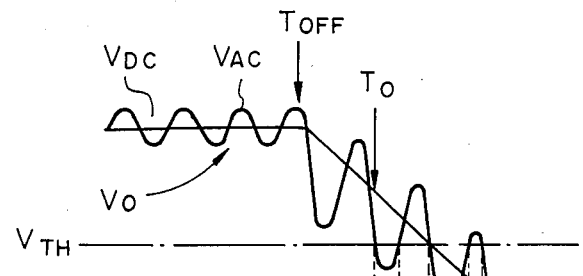
Fig.20A
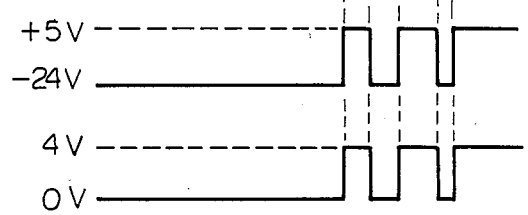
Fig.20B
Fig.20C

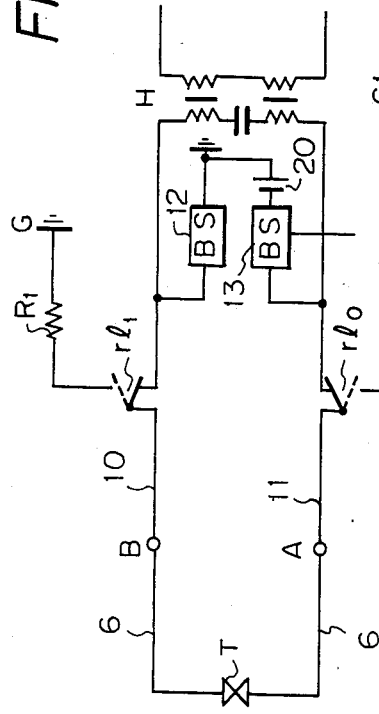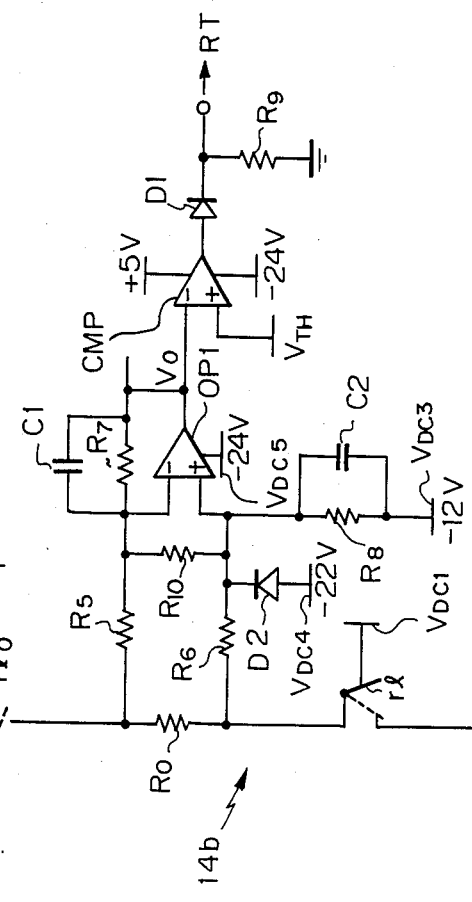
Fig. 21
| Fig. 21A | Fig. 21B |
Fig. 21A

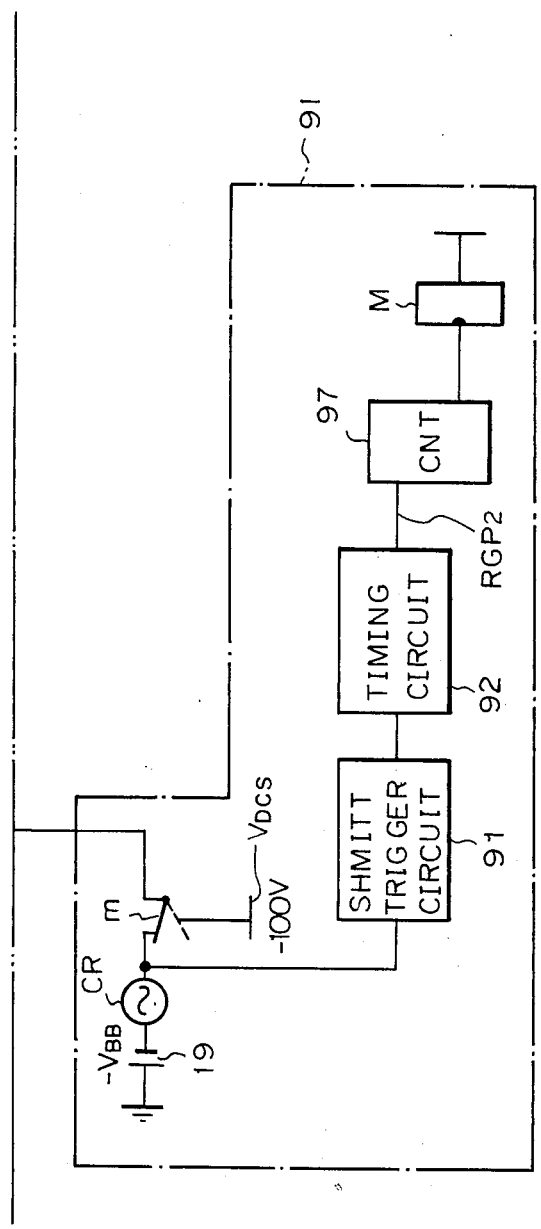

CALLING SIGNAL TRANSMISSION APPARATUS

This application is a continuation-in-part of application Ser. No. 738,657, filed May 28, 1985, now abandoned.

BACKGROUND OF THE INVENTION (1) Field of the Invention

The present invention relates to a line circuit (interface circuit) provided between a subscriber's telephone set and an exchange network. More particularly, it relates to a calling signal transmission apparatus connected to or arranged in the line circuit for controlling the transmission of a calling signal to a subscriber's telephone set.

(2) Description of the Related Art

Conventionally, when a call is received at a telephone set, a bell provided in the telephone set is intermittently activated by an intermittent ringing signal. The intermittent ringing signal is formed by intermittently cutting a continuous ringing signal of, for example, 20 Hz, by activation relay contacts. Thus, the intermittent ringing signal consists of a sequence in which, for example, a 20 Hz-continuous ringing signal is activated for one second followed by a no signal period of three seconds, i.e., silence, is repeated. The effective value of the amplitude of the continuous ringing signal is a high voltage of, for example, 90 V; a high energy level beyond the capability of the electronic switches constituting the communication network. When the communication network consists of a time-division digital switch, electronic circuits, and so forth, the above-mentioned continuous ringing signal, having the high effective voltage, cannot be directly transmitted on the speech path (communication line) through the communication network to the telephone set. The continuous ringing signal and the intermittent ringing signal sequence must be transmitted to the telephone set through the line after the line is cut off from the network during calling. Further, after the subscriber answers the calling signal and takes the handset off the hook, the line must be again separated from the continuous ringing signal and connected to the communication network. This control for transmitting and blocking a continuous ringing signal to and from a line is performed by control of a ringing signal transmission relay.

When a subscriber lifts the handset of the telephone in response to the ringing of the bell, that is, when the telephone set is in an off-hook state, ring trip equipment operates to restored (deenergize) the relay contacts, whereby the intermittent ringing signal is stopped. In this case, during the period from the off-hook state when the bell is ringing to the restoration of the relay contacts, that is, during the period of the ring trip operation, the 20 Hz-continuous ringing signal is sent through the communication line to the telephone set so that the signal is heard as an unpleasant tone by the subscriber. Therefore, the above-mentioned ring trip operation period should be activated as quickly as possible.

In a conventional line circuit, ring trip operation is realized, as later described in detail with reference to the drawings, mainly by hardware. That is, a direct-current loop detecting signal, produced when the telephone set is in an off-hook state during a no signal period in the intermittent ringing signal which is supplied through the relay contacts to the line circuit, is input as a silent trip detecting signal (in other words, a loop signal) through a voltage separation circuit into a control processor and is processed therein by software. However, a direct-current loop detecting signal, produced when the telephone set is in an off-hook state when a signal is activated during the intermittent ringing signal sequence, is output as a ring trip detecting signal through a voltage separating circuit different from the above to a logic circuit, and the relay contacts are then restored by the logic circuit.

When the ring trip operation, activated during a period when a signal is present, is realized only by the hardware described above, the system becomes uneconomical because the voltage separating circuits and the logic circuit must be added and thus the number of parts is increased.

Also, in a conventional system, once an off-hook state is realized while a bell is ringing, the relay contacts are fixed in the restored state by the hardware. Therefore, if the subscriber erroneously hangs-up the handset immediately after lifting it off the hook, it is impossible to reactivate (energize) the relay which is already in the restored state. Accordingly, the bell does not ring when there is an incoming call, and thus the problem arises where the subscriber cannot acknowledge the incoming call although the call is waiting for the telephone set.

Still further, there is another problem in that, if noise and the like causes an erroneous ring trip operation, i.e., an off-hook state is erroneously detected, the relay contacts are also fixed in the restored state and the bell will not ring.

The entire ring trip operation could be effected by software. However, as mentioned before, it is necessary to shorten as much as possible the time from when a subscriber lifts the handset off the hook to that when the relay contacts are restored. Therefore, if the entire ring trip operation is to be effected by the software, it must be carried out in real time. However, in this case, the software will be occupied by this operation for too long a time, in spite of the simple content of the process. This is obviously uneconomical, and thus a ring trip operation performed only by software has not been effected in practice.

From another point of view, if the ringing signal transmission relay is operated at an arbitrary timing, the high voltage of the continuous ringing signal could suddenly be impressed upon the channel or suddenly eliminated from the channel, resulting in the occurrence of impulse type noise in another channel adjoining that channel. Further, the rapid changes in current would cause electromagnetic induction, also generation noise in other circuits.

Therefore, in the past, the intermittent ringing signal was modified, for effecting a so-called dry operation of the relay contacts, by an interrupted ringing signal which is composed of, for example, a 100 millisecond nonsignal state and a successive 900 millisecond signal state, as later described in more detail with reference to the drawings. When the interrupted ringing signal is used, if the ringing signal transmission relay is operated or restored in the nonsignal state of the interrupted ringing signal, noise will not occur in the communication line during operation or restoration of the relay.

However, if the called subscriber takes the receiver off the hook in the middle of the ringing tone, the ring trip circuit operates to restore the ringing signal transmission relay. If the energy of the interrupted ringing signal at that time is high, however, the restoration of the relay generates noise on another channel for the same reasons as above.

From still another point of view, in the conventional calling signal transmission apparatus, a capacitor having a relatively large capacitance is used for detecting an off-hook state of the telephone set. This capacitor, however, causes various problems such as large external dimensions, long response time for the ring trip, or is inappropriate for message waiting and other special services, as later described in more detail with reference to the drawings.

From still another point of view, when a fault occurs in the calling signal transmission apparatus, the operation of the system itself is disordered. Therefore, the fault must be detected by some means.

Conventionally, the fault in the calling signal transmission apparatus has been detected by providing a fault detecting circuit in the calling signal transmission apparatus itself. According to this conventional fault detecting method, when a fault is detected by the above-mentioned detection circuit, the fault is informed to an external display unit or to a control processing unit.

Since the fault detecting circuit is additionally provided in the calling signal transmission apparatus and signal lines must be provided to transmit the fault to the display unit or to the central processing unit, the conventional method has disadvantages of requiring a large installation space and high cost.

Still further, when it is necessary to detect whether or not the calling signal transmission apparatus is mounted on or connected to the line circuit, a circuit for detecting the absence of mounting is necessary in addition to the fault detecting circuit, causing a further increase in the installation space and the cost.

SUMMARY OF THE INVENTION

Accordingly, an object of the present invention is to provide a calling signal transmission apparatus in which ring trip equipment is realized at a low cost by decreasing the number of the above-mentioned voltage separating circuits or by making the logic circuit not necessary so as to decrease the number of parts in comparison with the prior art.

Another object of the present invention is to provide a calling signal transmission apparatus in which the tolerance against error operations is improved and the service to subscribers is improved, by supervising ring trip detecting signals for a predetermined number of times so that, even when the handset is replaced immediately after being lifted off the hook or when a quasi-off-hook state (a stage in which the handset is not off the hook, but due noise is estimated to be) exists due to noise and the like, the relay contacts are again operated to cause the bell to ring.

Still another object of the present invention is to provide a calling signal transmission apparatus in which the ringing signal transmission relay is restored at the phase where the voltage and current of the A.C. component of the interrupted ringing signal are zero, so that when the handset is lifted off the hook while the bell is ringing, the noise generated at other circuits due to the restoration of the relay is reduced.

A still further object of the present invention is to provide a calling signal transmission apparatus in which a fault in the calling signal transmission apparatus is detected without providing an additional fault detecting circuit.

A still further object of the present invention is to provide a calling signal transmission apparatus in which a capacitor for detecting an off-hook state is eliminated, reducing the external dimensions and shortening the response time of the ring trip, and also allowing the above-mentioned message waiting and other special services.

The above objects are accomplished by ring trip equipment, including a ring trip detecting circuit for detection a ring trip signal in response to an off-hook operation of a telephone during a signal state of an intermittent ringing signal and a loop detecting circuit for detecting a loop signal in response to an off-hook operation of the telephone during a nonsignal state of the intermittent ringing signal. Also included are a logical OR gate circuit, for providing, as a status signal, a logical sum of the ring trip signal and the loop signal, and a supervising circuit for supervising the status signal. When an incoming call is being received by the telephone set, and when the supervising circuit detects an off-hook state in the status signal, the supervising circuit stops the transmission of a ringing signal to the telephone set, and carries out a second supervising operation for supervising the status signal. If an on-hook state is detected during the second supervising operation, said supervising circuit again transfers the ringing signal to the telephone.

BRIEF DESCRIPTION OF THE DRAWINGS

The above objects and features of the present invention will be more apparent from the following description of the preferred embodiments with reference to the accompanying drawings, wherein:

FIGS. 5A through 5E are voltage waveform diagrams for explaining the ring trip operation of the ring trip equipment shown in FIG. 3;

FIG. 7, including 7A and 7B, is a flow chart illustrating a call/receive operation by the conventional ring trip equipment shown in FIG. 6;

FIGS. 9A through 9E are voltage waveform diagrams for explaining a conventional control of a ringing signal transmission relay;

FIG. 10, including 10A and 10B, is a circuit diagram showing ring trip equipment according to a second embodiment of the present invention;

FIGS. 11A through 11J are voltage waveform diagrams for explaining the operation of the ring trip equipment shown in FIG. 10;

FIG. 20A through 20C are waveform diagrams showing the signal waveforms of key parts in FIG. 19; and FIG. 21, including 21A and 21B is a circuit diagram of a ring trip detecting circuit according to a fourth embodiment of the present invention.

DESCRIPTION OF THE PREFERRED EMBODIMENTS

Before explaining the embodiments of the present invention, an electronic exchange system including a calling signal transmission apparatus and ring trip equipment according to the invention will be explained with reference to FIG. 1.

Figure 1:
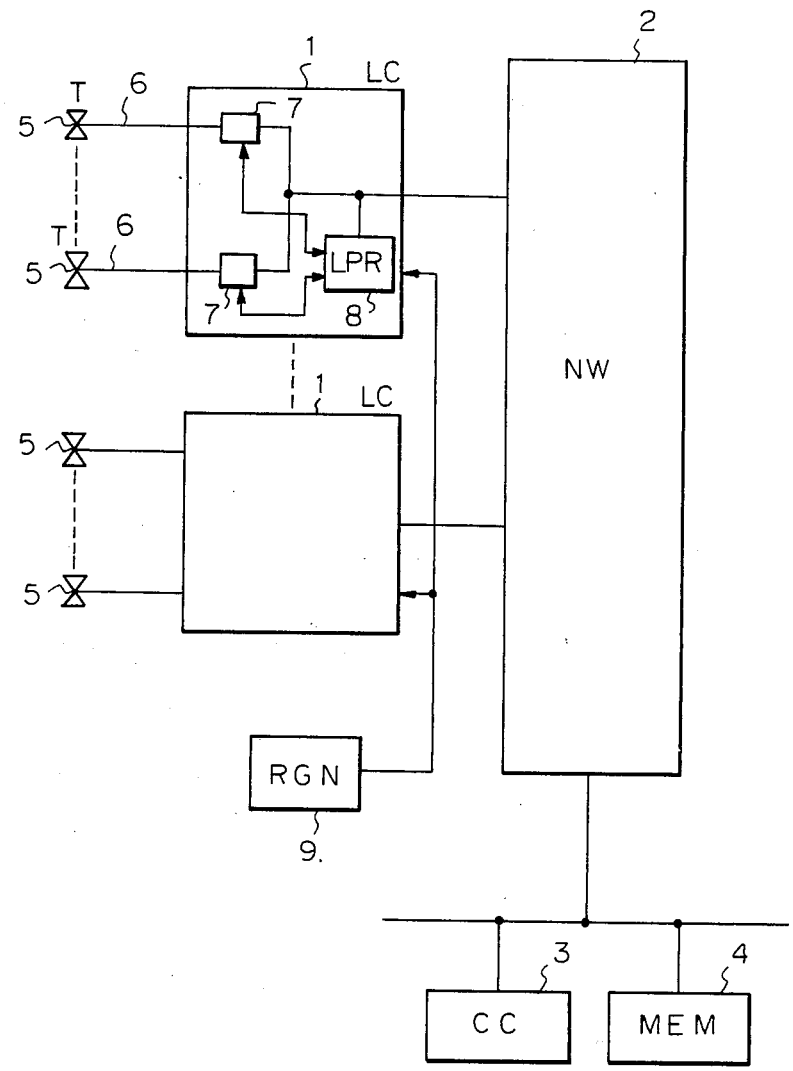
FIG. 1 is a block diagram illustrating an electronic exchange system including a calling signal transmission apparatus and ring trip equipment according to the present invention.

In FIG. 1, a plurality of line circuits (LC) 1 are connected to a switching network (NW) 2. The switching network (NW) 2 is controlled by a central control unit (CC) 3 and a memory (MEM) 4. In each line circuit 1, there is included a plurality of so-called BORSCHT function circuits 7, which are connected through subscriber lines 6 to a plurality of telephone sets (T) 5, and a line control processor (LPR) 8 for common control of these BORSCHT function circuits 7. A continuous ringing signal generator (RGN) 9 is commonly connected to all of the line circuits (LC) 1. The software for the central control unit (CC) 3 is formed for the purpose of controlling all of the communication lines including the subscriber lines 6, i.e., for effecting connection of a call to a telephone set 5 or for effecting various other services. The control by the central control unit (CC) 3 may be effected within a relatively loose time margin. The line control processor 8 in each line circuit (LC) 1 commonly controls a plurality of subscriber lines accommodated in the line circuit (LC) 1. This control by the line control processor 8 however, is strictly carried out in a time nearly equal to real time processing. Data exchange between each line circuit 1 and the central control unit (CC) 3 is carried out, in the same way as in conventional digitalized audio signal apparatus, through leased time slots on the switching network (NW) 2. The signals from the continuous ringing signal generator 9 are distributed to respective line circuits 1 under the control of the line control processor 8.

The calling signal transmitting apparatus and the ring trip equipment therein are included in each of the BORSCHT function circuits 7 in the line circuits (LC) 1.

First Embodiment

Figure 2:
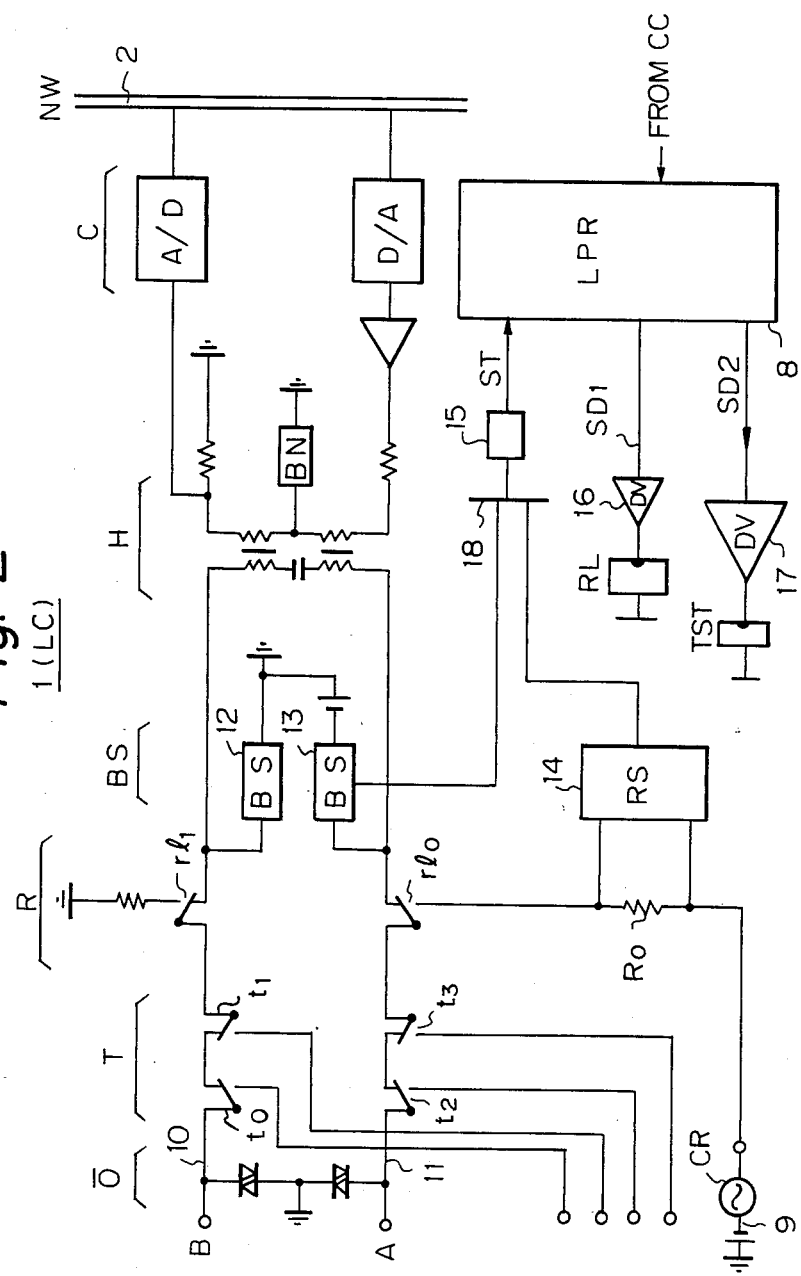
FIG. 2 is a block diagram illustrating an example of the calling signal transmitting apparatus in the line circuit (LC) 1 shown in FIG. 1, according to an embodiment of the present invention.

An example of the calling signal transmitting apparatus in the subscriber line circuit (LC) 1 according to an embodiment of the present invention is illustrated in FIG. 2. As is well known, the line circuit (LC) 1 has the line functions expressed by BORSCHT. In the expression BORSCHT, B represents a battery feed function, O an over voltage protection function, R a ringing function, S a supervisory function, C an A/D and D/A converting (coding and decoding) function, H a two wire-four wire converting function (hybrid transformer), and T a testing function. In the figure, A and B are terminals of communication lines 10 and 11 of the line circuit (LC) 1, and are connected to a telephone set (T) 5 (FIG. 1). Battery feeding and supervising circuits (BS) 12 and 13 supply power to the communication lines 10 and 11 and supervise a direct current loop of the communication lines 10 and 11 during a silent trip, that is, when relay contacts $rl_0$, $rl_1$, and $t_0$ through $t_3$ connect the lines 10 and 11 to the circuits (BS) 12 and 13. During the silent trip, a continuous ringing signal is not transmitted to the lines 10 and 11. A ring trip detecting circuit (RS) 14 detects a direct current loop in the communication lines when a ring trip occurs, that is, when the continuous ringing signal CR is supplied through the relay contacts $rl_0$, $rl_1$, and $t_0$ through $t_3$ to the lines 10 and 11. Reference numeral 15 is an E/G separating circuit for separating the ground of a power supply for the E system such as those including logic circuits activated by ±5 V, from the ground of another power supply for the G system such as those activated by −48 V. The purpose of this separation is to prevent noise due to the power supply of −48 V from entering the logic circuits activated by ±5 V. RL is a relay for driving the relay contacts $rl_0$ and $rl_1$; 16 a driver for driving the relay RL; TST a relay for driving relay contacts $t_0$ through $t_3$; 17 a driver for driving the relay TST; 18 a logical OR gate; CR a continuous ringing signal generator; and SD1 and SD2 relay driving signals sent from the control processor 8.

The present invention relates to the ringing function R and the battery feeding and supervising function BS.

Figure 3:
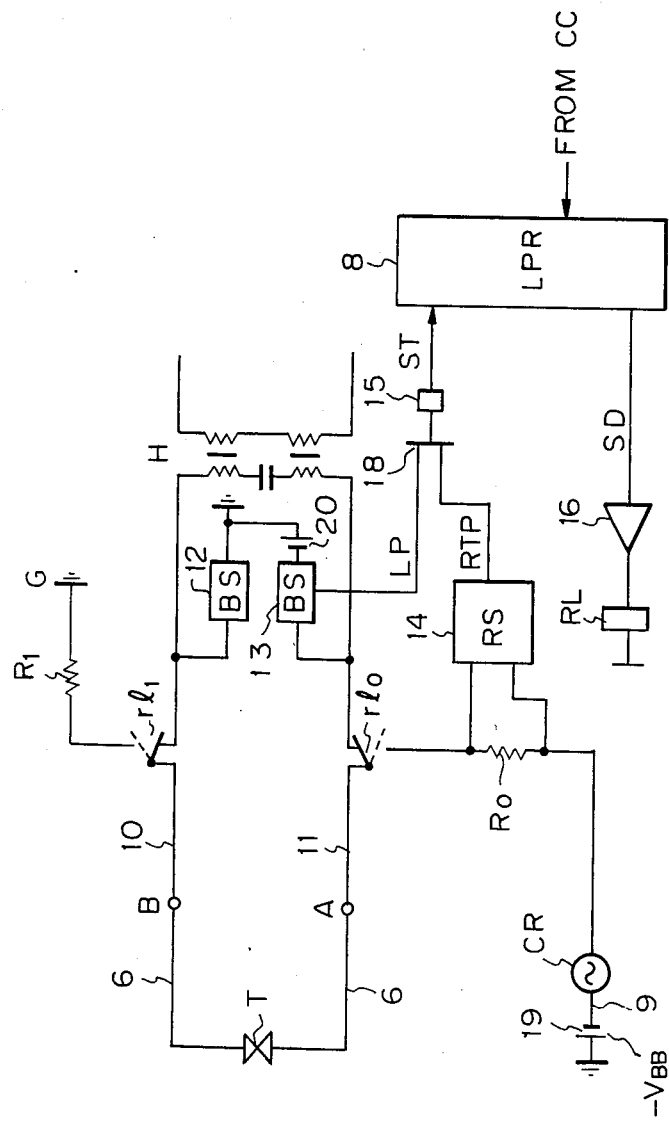
FIG. 3 is a block diagram illustrating ring trip equipment which is a part of the line circuit shown in FIG. 2, according to an embodiment of the present invention.

FIG. 3 shows the ring trip equipment according to an embodiment of the present invention, which is a part extracted from the line circuit (LC) 1 and the line control processor shown in FIG. 2, and which carries out the ring trip operation in accordance with the embodiment of the present invention. In FIG. 3, the same portions as the portions illustrated in FIGS. 1 and 2 are labelled with the same reference numbers and characters (this applies throughout the figures). A continuous ringing signal generator 9 is constituted by the continuous ringingsignal oscillator CR and a direct-current power supply ($-V_{BB}$) 19 of, for example, −48 V, connected in series. Also, another direct-current power supply 20 ($-V_{BB}$) connected in series to the battery feeding and supervising circuit 13. According to this embodiment of the invention, a loop signal LP from the battery feeding and supervising circuit 13 and an output RTP of the ring trip detecting circuit 14 are input to the logicalOR gate 18. The output of the logical OR gate 18 is input as a status signal ST, through the E/G separating circuit, to the control processor 8. The E/G separating circuit 15 electrically separates, as mentioned before, the G system having the power supply of −48 V from the E system having the power voltage supply voltage of ±5 V. The G system in the figure includes the battery feeding and supervising circuits (BS) 12 and 13, the ring trip detecting circuit (RS) 14, the continuous ringing signal oscillator CR, the telephone set T, the two-wire side of the hybrid transformer H, and other elements. The E system includes the logical OR gate 18, the E/G separating circuit 15, the line control processor 8, the driver 16, the relay RL, the four-wire side of the hybrid transformer H, and other elements.

Figure 4:
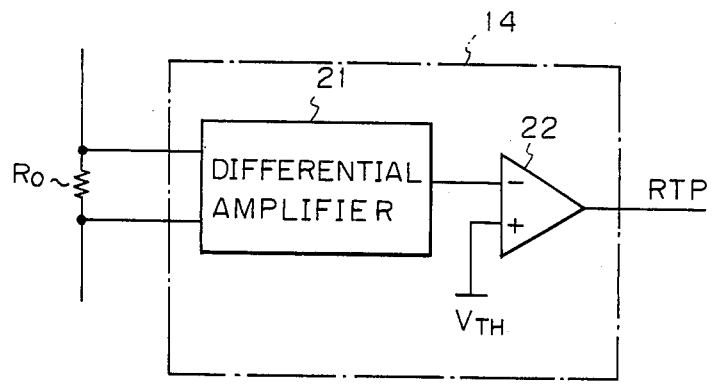
FIG. 4 is a block diagram of a ring trip detecting circuit (RS) 14 shown in FIG. 3.

The ring trip detecting circuit 14 constitutes, for example, as illustrated in FIG. 4, a differential amplifier 21 having an integration function for amplifying the voltage across the resistor $R_0$, and a comparator 22 for comparing the output of the integrator with a predetermined threshold voltage $V_{th}$. A more detailed description of th.e ring trip detecting circuit 14 will be, later described with reference to another embodiment of the present invention.

Next, the operation of the ring trip equipment shown in FIG. 3 will be described. In FIG. 3, when a call is not waiting at the telephone set T, the relay contacts $rl_0$ and $rl_1$ are in the restored state (in the state illustrated by solid lines in the figure) and thus the telephone set T is connected to the battery feeding and supervising circuits (BS) 12 and 13. In this state, when the telephone set T is in an on-hook state, a capacitor 137 (see FIG. 18) in the telephone set T cuts the direct-current loop so that no current flows through the lines 10 and 11. However, when the telephone set T is in an off-hook state, a direct-current loop through the telephone set T is formed so that a direct current supplied from the power supply 20 flows through the communication lines 10 and 11. The battery feeding and supervising circuit 13 detects this direct current, and the detected signal is transferred as a status signal ST, signifying that the telephone set T is in an off-hook state, to the control processor 8 through the logical OR gate 18 and the E/G separating circuit 15.

When a call is effected for the telephone set T, the line processor 8 generates, in response to a control signal from the central control unit (CC) 3 (FIG. 1), a relay driving signal SD which is intermittently applied from the control processor 8 through the flip-flop 152 and the relay driver 16 to the relay RL, whereby the relay contacts $rl_0$ and $rl_1$ repeat, for example, the energized state (the dotted-line state in FIG. 3) for one second and the restored (deenergized) state (the solid-line state in FIG. 3) for three seconds. As a result, the 20 Hz-continuous ringing signal, also referred to as CR, from the continuous ringing signal generator 9 is transferred through the relay contact $rl_0$, the telephone set T, the relay contact $rl_1$, and the resistor $R_1$, as an intermittent ringing signal, intermittently ringing a bell in the telephone set T.

Assume a state in which a call is -effected for the telephone set T, and assume that the relay contacts $rl_0$ and $rl_1$ are in the energized state, that is, the bell in the telephone set T is ringing. In this state, when the handset is lifted off the hook at the telephone set T, the ring trip operation is as described with reference to the voltage waveforms illustrated in FIGS. 5A through 5E. In FIGS. 5A through 5E, the telephone set T is in an on-hook state until a time $t_1$, so that the bell is ringing. In this state, as illustrated in FIG. 5E, the relay RL is in the energized state (dotted-line state in FIG. 3) so that the relay contacts $rl_0$ and $rl_1$ form an electrical path from the continuous ringing signal generator 9 through the line 11, the telephone set T via subscriber line 6, the line 10, and a resistor $R_1$ to the ground G. Since the telephone set T is in an on-hook state, a direct-current loop is not formed. Therefore, before the off-hook operation, the D.C. potential at the terminal A is equal to the power supply voltage of $-V_{BB}$ (−48 V) as shown in FIG. 5A.

When the telephone T is in an off-hook state at the time $t_1$, both ends of the telephone set T are connected in direct-current fashion by switches 135 and 135$a$ (see FIG. 18) in the telephone set T, so that a direct-current loop is formed by a path through the power supply 19, the continuous ringing signal oscillator CR, the resistor $R_0$, the relay contact $rl_1$ and the resistor $R_1$. Thus, a direct-current voltage is superimposed on the 20 Hz continuous ringing signal applied to the terminal A. Also, by the off-hook operation, the impedance in the telephone set T is decreased so that the D.C. voltage at the terminal A is raised to $-V_a$ (for example −24 V), as illustrated in FIG. 5A. Because the current flowing through the resistor $R_0$ is increased after the off-hook operation, the differential amplifier 21 (FIG. 4) in the ring trip detecting circuit 14 amplifies the amplitude of the alternating current voltage component of the voltage across both ends of the ring trip detecting resistor $R_O$. In response to the raising of the direct current voltage at the terminal A after the off-hook operation, the output D.C. voltage of the differential amplifier 21 having an integration function gradually decreases. Thus, at the output of the differential amplifier 21, an output voltage waveform as illustrated in FIG. 5B is obtained. The comparator 22 compares this output voltage with a threshold voltage $V_{th}$ to obtain a ring trip signal RTP as shown in FIG. 5C. The ring trip signal RTP is transferred through the OR gate 18 and E/G separating circuit 15 and input as a status signal ST to the control processor 8. The control processor 8 supervises the status signal ST by means of a scan signal SCN occurring with a predetermined period, as shown in FIG. 5D. At a time $t_2$, when the status signal ST turns to a logic "1", the relay RL is immediately restored.

There may, however, be a problem in that the relay RL is not immediately restored, as shown in FIG. 5E by the dotted line. That is, the pulse width of the logic "1" of the ring trip signal RTP gradually increases along with the progress of the diffenential amplification. Therefore, the pulse width of the logic "1" of the signal RTP at the time $t_2$ is small. Because of this, when the period of the scanning signal SCN is long or when the frequency of the continuous ringing signal CR is high, the control processor 8 cannot detect the logic "1", at the time $t_2$, of the status signal, and may detect the next logic "1" at a time $t_3$. In this case, the restoring of the relay RL is also delayed until the time $t_3$.

However, the period between the times $t_2$ and $t_3$ lasts for only two cycles of the scanning signal, and such a delay of the reset in the relay RL does not cause any special problem.

In order to ensure the detection of an off-hook state, the relay RL can be restored only after the status signal ST becomes a logic "1" in both of two continuous pulses of the scanning signal SCN. In this case, however, the relay RL is not restored until the pulse width of the logic "0" of the status signal ST becomes more than the period of a continuous two times scanning by the scanning signal SCN, and therefore, it is not practical because the period from a time when a subscriber lifts the handset off the hook to a time when the 20 Hz intermittent ringing tone stops at the telephone set would then be too long.

On the other hand, if, as described before, the relay RL is fixed in the restored state when a logic "1" of the status signal ST is first-detected by a one pulse scanning of the scanning signal SCN, the relay RL cannot be energized again to ring the bell even when the subscriber erroneously replaces the handset on the hook of the telephone set T or even when the above-mentioned logic "1" of the status signal ST is produced by an error operation due to noise and the like. Accordingly, in the embodiment of the present invention, as later described in detail with reference to a flowchart of FIG. 8, after a restored of the relay RL by a first scanning, the -status signal ST is again supervised by the second scanning, and, if a status signal ST once returns to a logic "0" the relay RL is again energized, and the bell is made to ring.

In a state when a call is effected for the telephone set T, and when the relay contacts rl$_0$ and rl$_1$ are in their restored states, that is, in a nonsignal (silent) state in the intermittent ringing tone sequence, then, if the handset is lifted off the hook at the telephone set T, the battery feeding and supervising circuit 13 detects a direct-current loop so that a loop signal (silent trip signal) LP is transferred through the logical OR gate 18 and the E/G separating circuit and applied as a status signal ST to the line control processor 8. The line control processor 8 then fixes the relay RL in the deenergized state.

Figure 6:
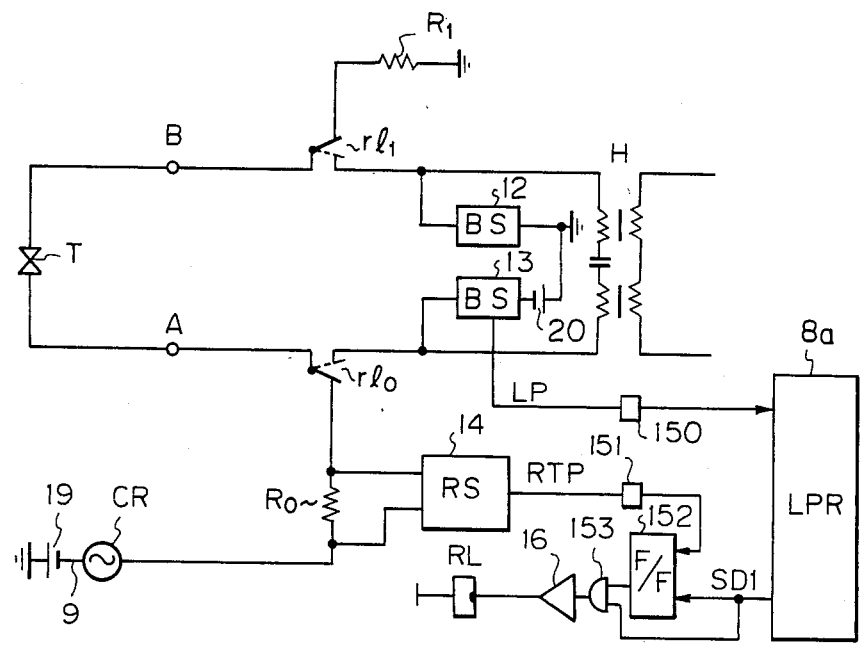
FIG. 6 is a circuit diagram illustrating an example of conventional ring trip equipment, shown for comparison with the embodiment of the present invention shown in FIG. 3.

FIG. 6 is a circuit diagram illustrating an example of conventional ring trip equipment shown for comparison with the embodiment of the present invention shown in FIG. 3. In FIG. 6, portions different from FIG. 3 are those wherein the single E/G separating circuit 15 and the logic OR gate 18 in FIG. 3 are realized by two E/G separating circuits 150 and 151, a flip-flop 152, and an AND gate 153; and in addition the software processing by the control processor 8a is different from the software processing by the control processor 8 in FIG. 3. To briefly explain the ring trip operation by the conventional circuit shown in FIG. 6, the ring trip detecting circuit 14 detects the direct current due to an off-hook state of the telephone T, when the bell is ringing, and transfers it as a ring trip signal RTP through the E/G separating circuit 151 to the flip-flop 152. When the flip-flop 152 receives the ring trip signal RTP, it switches its output from the logic "1" to the logic "0", thereby closing and AND gate 153 so as to inhibit the passage of the relay driving signal SD1, and thus the relay RL is restored (deenergized). This process is effected by hardware, and therefore, the processing speed is high and the deenergizing of the relay is effected rapidly. For an off-hook state in the intermittent ringing tone, the circuit (BS) 13 detects the loop signal (silent trip signal) LP and transfers it through the E/G separating circuit 150 to the line processor 8a. However, as mentioned before, the number of E/G separating circuits is doubled in comparison with that of the embodiment of the present invention shown in FIG. 3, and the flip-flop 152 and AND gate 153 are necessary, so that the number of parts is large and thus the system is uneconomical. Also, even when a subscriber erroneously replaces the handset on the hook after lifting it off the hook of the telephone set T, or when a quasi-off-hook state exists due to noise, the flip-flop 152 has been set in response to the first off-hook state so that the relay RL is not reenergized, and accordingly, the bell does not ring. Therefore, the subscribers suffer from unsatisfactory service.

Contrary to this, in the equipment of FIG. 3 according to the embodiment of the present invention, since the number of parts is small, the system can be realized at a low cost. Further, by taking the ring trip signal through the logic OR gate 18 into the control processor 8, the relay restoring operation speed is not lowered, and the ringing of the bell is not stopped even when a quasi-off-hook state exists due to an erroneous replacement of the handset or due to noise.

Figure 8B:
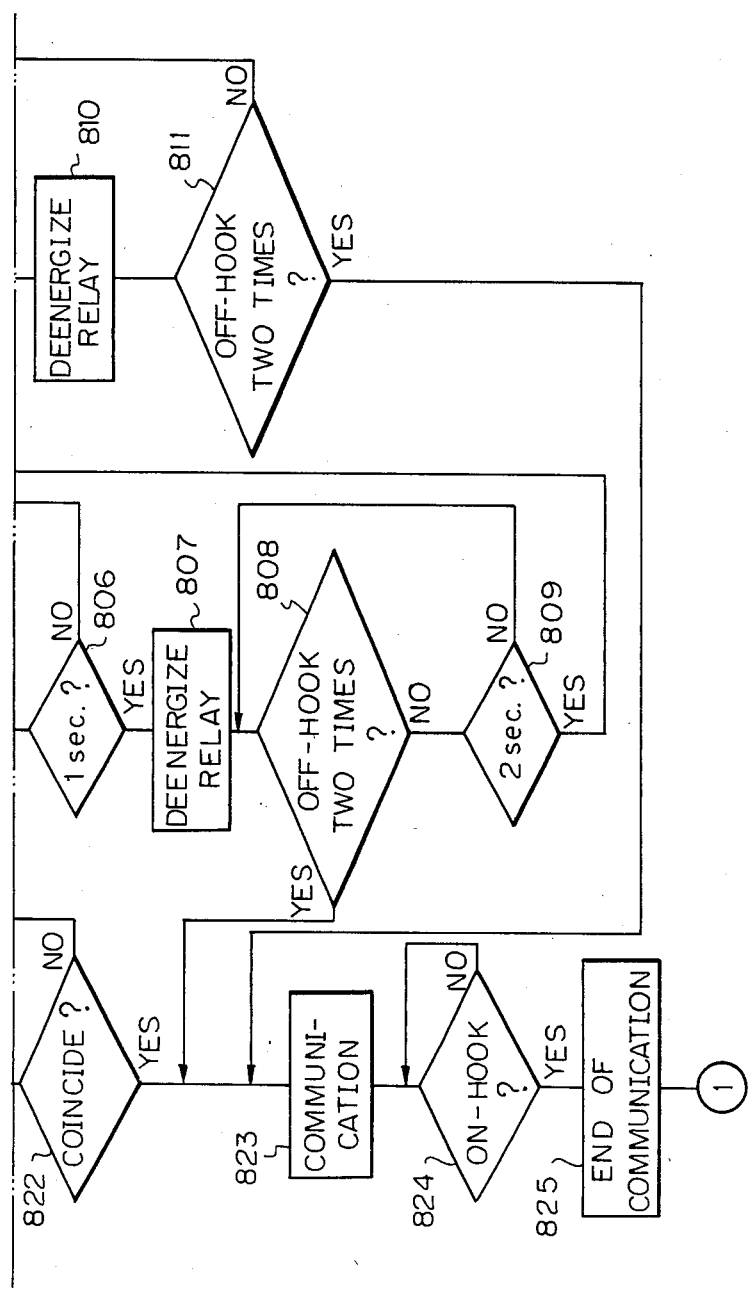
FIG. 8, including 8A and 8B, is a flow chart illustrating a call/receive operation by the ring trip equipment shown in FIG. 3 according to the embodiment of the present invention.

FIG. 7 is a flow chart illustrating a call/receive operation by the conventional ring trip equipment shown in FIG. 5, and FIG. 8 is a flow chart illustrating a call-/receive operation by the ring trip equipment according to the embodiment of the present invention illustrated in FIG. 3. Steps 701–710 and steps 720–725 in FIG. 7 are equivalent to steps 801–810 and 820–825 in FIG. 8. In FIG. 8, a step 811 is added. However, the decision as to whether or not the telephone set T is in an off-hook state in the step 705 in FIG. 7 is carried out by the hardware using the flip-flop 152 and the AND gate 153 as mentioned before. In contrast, the decision as to whether or not the telephone set T is in an off-hook state in step 805 in FIG. 8 is carried out using supervising the status signal ST using the software in the line control processor 8.

The incoming/outgoing call operation by the control processor 8 in the ring trip equipment shown in FIG. 3 is explained with reference to the flowchart of FIG. 8. In step 801, a decision is made as to whether or not the telephone set t is making a call. Also, it is discrimminated in step 801 as to whether or not the telephone set T is in an off-hook state. If not, a decision is made in step 802 as to whether or not a call is being received at the telephone set T. If a call is being received, call receiving control is effected in step 803, and in step 804, the relay RL is energized. In steps 805 and 806, a decision is made as to whether or not an off-hook operation is effected during the one second period when the bell is rung, by supervising a ring trip signal in the status signal ST. The supervision of the status signal is, as mentioned before with reference to FIG. 3, carried out by the scan signal SCN having an appropriate frequency. Then, in step 805, a decision is made as to whether or not the telephone set T is in an off-hook state. The decision in step 805 is effected by one pulse of the scan 35 signal SCN. Accordingly, when an off-hook state is detected by one scan signal pulse, the relay RL is immediately deenergized in step 810. Therefore, the deenergization of the relay RL can be effected within a short time, without relaying upon the hardware as in the prior art. After step 810, the ring trip signal RTP is scanned with several pulses (two pulses in this embodiment). If, in all of the pulses, the off-hook state still continues, then, the relay RL is fixed in the deenergized state, and, in step 823 communication is commenced. If an on-hook state is detected in step 811, the process goes back to step 804, and the relay RL is again energized. Here, even if the on-hook state is caused by an error by the subscriber, it is detected in step 811 so that the bell will again ring. Also, even if a quasi-off-hook state is caused by noise and detected in step 805, the relay RL is again energized to ring the bell. The above described operation in steps 804–806 and in steps 810 and 811 is the ring trip operation for detecting an off-hook state during ringing of the bell.

In step 807, if it is discriminated that one second has passed, then the process enters into the period during which the bell does not ring. To stop the ringing of the bell, the relay RL is deenergized in step 807. Then, in steps 808 and 809, a decision is made as to whether or not an off-hook operation is effected during the two seconds in which the bell does not ring. That is, in step 808, when the silent trip signals from the supply feeding and supervising circuit (BS) 13 (FIG. 3) are continuously detected by a plurality of pulses of the scan signal SCN (two pulses in this embodiment), then, the relay RL is deenergized and fixed in the deenergized state so that communication is commenced in step 823. Once an on-hook state is detected during the above-mentioned plurality of times of conducting scanning, then, in step 809, a decision is made as to whether or not the nonsignal period in the intermittent ringing signal continues for two seconds. If not, the process returns to step 808. If two seconds have passed, the process returns to step 804, in order to cause the bell to ring again so that the relay RL is again energized. The operations is steps 807-809 are a silent trip operation for detecting an off-hook state during the time in which the bell does not ring.

In step 801, if it is discriminated or determined that the telephone set T is being used for an outgoing call, the process advances to step 820 to control the outgoing calling,-and then, in step 821, the line control processor 8 receives dial pulses. In this case, for the purpose of removing noise due to chattering and so forth, several sets of the dial pulses are received (in this embodiment, twice), and, only when they coincide in step 822, are the dial pulses determined to be valid, so that the receiving of the dial pulses is completed. Then, proceeding to step 823, communication is effected.

After communication in step 823, a decision is made in step 824 as to whether or not an on-hook operation is effected. If an off-hook state is detected in step 724, the communication is completed in step 825.

As is apparent from the foregoing explanations, according to the embodiment of the present invention, in the line circuit of the time-division switching equipment, a logical sum of a loop signal (silent trip signal) and a ring trip signal is input to a line control processor, and the ring trip operation as well as the loop detecting operation are effected by software processing in a line control processor, whereby a low cost ring trip equipment in which the number of parts is decreased in comparison with the prior art can be provided. Also, for a quasi-off-hook state due an error by a subscriber after lifting the handset off the hook, or for restoration of a relay by an error operation due to noise, the bell is again made to ring. Therefore, ring trip equipment can be obtained in which the tolerance against error operation is improved. Further, an effect is also obtained wherein the problem of the time delay in ring trip operation by a conventional software can be resolved by the software in the line control processor according to the above embodiment of the present invention.

Second Embodiment

As described before, the continuous ringing signal is modified for effecting a dry operation of the relay contacts. In the dry operation, the relay contacts are driven during nonsignal periods formed in the continuous ringing signal.

An explanation will be given of the conventional method of control of a ringing signal transmission relay with reference to the waveform diagrams shown in FIGS. 9A through 9E. FIG. 9A shows a continuous ringing signal CR of a low frequency of, for example, 16 Hz or 20 Hz. To modify the continuous ringing signal CR, a phase signal RGP0 has been used to form an interrupted ringing signal IR as shown in FIG. 9C. In other words, in the example of FIG. 9B, the phase signal RGP0 has been composed of a cycle having a 100 millisecond high level and a successive 900 millisecond low level. The interrupted ringing signal IR has been obtained by cutting the continuous ringing signal CR during the time corresponding to the high level of the phase signal RGP0. The interrupted ringing signal IR repeats the phases #0, #1, #2, and #3 each comprised of the 100 millisecond nonsignal state corresponding to the high level of the phase signal RGP0 and the successive 900 millisecond signal state, the frequency and amplitude of the signal in the signal state being identical to those of the continuous ringing signal CR. If the ringing signal transmission relay RL is energized or deenergized in the nonsignal state of the interrupted ringing signal IR, noise will not occur in the communication channel 11 and 12 during energization or deenergization of the relay.

FIG. 9D is a waveform diagram of a relay drive signal SD for energizing or deenergizing the ringing signal transmission relay RL for transmission of the interrupted ringing signal IR to the channel. The signal SD is used for forming the intermittent ringing signal composed of a cycle of about one second (precisely, 900 millisecond) signalstate and a successive 3 second nonsignal state. In this example, the relay drive signal SD is raised at the time $t_1$ within the period of the initial nonsignal state of phase #0. The signal SD is lowered at the time $t_2$ in the period of the nonsignal state after the completion of #0. By this, the interrupted ringing signal IR of phase #0 is transmitted to the channel, and thus the electric bell of the telephone set T of the subscriber being called is repeatedly rung for 900 milliseconds and not rung for 3.1 seconds. Further, no noise due to the energization and deenergization of the relay enters the other lines.

Incidentally, the phases #1, #2, and #3 of the interrupted ringng signal IR may be used to ring bells in other telephone sets.

However, if the called subscriber takes the receiver off the hook in the middle of the ringing of the ringing tone as shown in FIG. 9E, for example, at a time $t_3$, an off-hook detection signal HK falls and, accordingly, the ring trip circuit operates to deenergize the ringing signal transmission relay RL. If the energy of the interrupted ringing signal at time $t_3$ is high, however, the deenergization of the relay RL generates noise on another line for the same reasons as above.

To solve the above problem, in the second embodiment of the present invention, the ringing signal transmission relay is deenergized at the phase where the voltage and current of the A.C. component of the interrupted ringing signal are zero, so even if an off-hook operation is made while the bell is ringing, the noise generated at other circuits due to the deenergization of the relay is reduced.

Below, an explanation is given of the second embodiment of the present invention with reference to FIG. 10 and FIGS. 11A through 11J. FIG. 10 is a circuit diagram showing ring trip equipment according to the second embodiment of the present invention. In FIG. 10, the same portions as those in FIG. 3 are numbered by the same reference numerals. The differences from FIG. 3 are that, in FIG. 10, a ringing signal generator 90 and a flip-flop 97 are provided. Also, the constitution of the hardware and software for a line control processor 81 is slightly different from those of the line control processor 8 in FIG. 3.

The ringing signal generator (TG) 90 includes in addition to the continuous ringing signal oscillator CR and the power supply 19, a Schmitt trigger circuit 91 for shaping a first phase signal RGP1 having a rectangular waveform, a first timing circuit 92 for generating a second phase signal RGP2, which is the same as the conventional phase signal, RGP0 shown in FIG. 9B, a second timing circuit 93 for generating a third phase signal RGP3, a NAND gate 94, a photocoupler 95, and a diode bridge 96.

The line control processor 81 includes a flip-flop consisting of NAND gates 810–813, and a processor 814.

FIGS. 11A–11J are voltage waveform diagrams of various parts of the circuit of FIG. 10. In FIG. 10 and FIGS. 11A–11J, at the output of the continuous ringing signal oscillator CR, there is, as shown in FIG. 11A, an overlapping of a −48 V direct current (D.C.) voltage due to the direct current power source 19. A continuous ringing signal CR of, for example, 20 Hz, is applied to the diode bridge 96 and Schmitt trigger circuit 91. The Schmitt trigger circuit 91 compares the continuous ringing signal CR with an appropriate threshold voltage $V_{th}$ for output of the first phase signal RGP1 shown in FIG. 11B. The first phase signal RGP1 shows the predetermined phase for each cycle of the continuous ringing signal CR. In other words one cycle of the first phase signal RGP1 corresponds roughly to one cycle of the continuous ringing signal CR, but the rise of the first phase signal RGP1 is faster than by the time t than the point of intersection of the continuous ringing signal CR with the D.C. Voltage −48 V, while the fall of the first phase signal RGP1 is slower by the time t than the point of intersection of the continuous ringing signal CR with the D.C. Voltage −48 V.

The first phase signal RGP1 is applied to the clock input CLK of the flip-flop 97 and input to the first and second timing circuits 92 and, 93. The first phase signal RGP1 is also applied to the line processor (LPR) 81 for counting the number of phases of the continuous ringing signal CR.

The first timing circuit 92 prepares the second phase signal RGP2 shown in FIG. 11C. The second phase signal RGP2 is for preparing the interrupted ringing signal IR shown in FIG. 11D and is the same as the signal RGP0 shown in FIG. 9B. In other words, this signal has a one second cycle consisting of a 100 millisecond ON period and a 900 millisecond OFF period, the ON periods corresponding precisely to the distance between two points of two cycles of intersections of the continuous ringing signal CR with the D.C. Voltage −48 V. The second phase signal RGP2 is applied through the NAND gate 94 to the light emitting element of the photocoupler 95. Accordingly, in the continuous ringing signal CR applied to the diode bridge 96 output is prohibited during the ON period of the second phase signal RGP2 and the interrupted ringing signal IR shown in FIG. 11D is obtained at the output of the diode bridge 96. This interrupted ringing signal IR is the same as that shown in FIG. 9C.

The second timing circuit 93 prepares the third phase signal RGP3, shown in FIG. 11E. This third phase signal RGP3 falls at the same timing as the rise of the second phase signal RGP2 and then rises after, for example, 50 milliseconds. The low level of the third phase signal RGP3 is repeated in every group of four phases #0 through #3. In the example shown in FIG. 11E, the low level of the signal RGP3 appears in the phase #0. The third phase signal RGP3 and the first phase signal RGP1 are input into the processor 814 in the line control processor 81, the processor 814 preparing the relay drive signal SD shown in FIG. 11F. The relay drive signal SD rises at a time when the third phase information RGP3 is at the low level in the beginning of a certain phase period such as the phase #0 (see FIG. 9C) which is intended to include the signal state of 900 millisecond in the intermittent ringing signal. The processor 814 counts up the pulses of the first phase signal RGP1 from a time when the third phase signal RGP3 is at the low level. The relay drive signal SD falls when the counting by the processor 814 represents a period of 50 milliseconds in the beginning of the next phase period #1 directly after completion of the period of the phase #0. In order to effect a dry operation of the relay RL, the OFF period of the third phase signal RGP3 and the above-mentioned 50 millisecond period in the beginning of the next phase #1 must be smaller than the period of the nonsignal state of the interrupted ringing signal IR, i.e., 100 milliseconds, in the figure. This is to avoid the fall of the relay drive signal SD in the signal state of the interrupted ringing signal IR.

The relay drive signal SD may be prepared, instead of using the third phase signal RGP3, by using the rise of the second phase signal RGP2 by the processor 814.

The relay drive signal SD is impressed on one of the inputs of the NAND gate 811, which is an element of flip-flop.

The ring trip detecting circuit (RS) 14 outputs a ring trip signal RTP of logic "1" (FIG. 11G) through the OR gate 18 and the E/G separating circuit 15 to one input of the NAND gate 810 while the telephone set T is in an on-hook state. When the ring trip signal RTP is logic "1", the output of the NAND gate 810, which also is another element of the flip-flop, is latched to logic "0" and the output of the NAND gate 811 is latched to logic "1". When the ring trip signal RTP is logic "1" and the relay drive signal SD is logic "0", the output of the NAND gate 812 is logic "1", and therefore, the logic "0" is input to the D input of the flip-flop 97 through the NAND gate 813 (FIG. 11H). In this state, if the relay drive signal SD rises shortly after the time $t_4$ in accordance with the fall of the third phase signal RGP3, the output of the NAND gate 812 becomes logic "0" and, therefore, the D input of the flip-flop 97 uses the first phase signal RGP1 as its clock signal, and so switches the output $\overline{Q}$ from "1" to "0" at the time $t_5$ (FIG. 11I) of the first rise of the first phase signal RGP1 after the time $t_4$. The falling of the output $\overline{Q}$ of the flip-flop 97 to the logic "0" results in energization of the relay RL (FIG. 11J) and switching of the relay contacts $rl_0$ and $rl_1$ from the restored state (the solid line state) to the operation state (the dotted line state). By this, the interrupted ringing signal IR is transmitted to the telephone set T.

If the receiver is taken off the hook while the bell of the telephone set T is receiving an interrupted ringing signal IR and is ringing, for example, at time $t_6$, in the past there was the problem of generation of noise in other communication channels. This was because the voltage of the interrupted ringing signal IR was a high voltage of, for example, −100 V, at time $t_6$ and this high voltage would be suddenly eliminated from the communication line 10a, 11a by the action of the relay RL.

In this second embodiment of the present invention, if the receiver is in an off-hook state at time $t_6$, the ring trip circuit 14 detects this and temporarily changes the ring trip signal RTP to the logic "0", which is applied through the OR gate 18 and the E/G separating circuit 15 to one input of the NAND gate 810. Then, the output of the NAND gate 11 is switched to logic "0", whereby the D input of the flip-flop 97 becomes logic "0". Therefore, at the time $t_7$ of the first rise after the time $t_6$ of the first phase signal RGP1, the inverted output $\bar{Q}$ of the flip-flop 97 becomes logic "1".

The relay RL is deenergized at a time $t_8$, which is a time t necessary for the deenergization of the relay RL after the time $t_7$ where the inverted output $\bar{Q}$ becomes logic "1". Accordingly, the relay contacts $rl_0$ and $rl_1$ again connect line 11 to line 11a and line 10 to line 10a. This ends the transmission of the interrupted ringing singal IR to the telephone set T.

The voltage of the interrupted ringing signal IR at the time $t_8$ where the relay contact $rl_0$ and $rl_1$ are switched is −48 V, i.e., the level of the superimposed D.C. voltage. Even if the relay RL is energized or deenergized at this point, this does not become a factor causing generation of noise in other circuits as with the operation of the relay RL in the nonsignal state. This is because the impedance of the telephone set T in the off-hook state subsequent to the time $t_6$ appears as roughly a pure resistance, so the voltage waveform and the current waveform at the relay contacts $rl_0$ and $rl_1$ may be thought of as being the same. Therefore, if the relay RL is energized or deenergized at the intersection of the interrupted ringing signal IR and the D.C. Voltage −48 V, the alternating current component is supplied voltage and current both become zero and no inductance to the other circuits.

In the above-mentioned embodiment, the first phase signal RGP1 was prepared under the assumption that both the energization time and deenergization time of the relay are considered to be the same as t. In practice, however, the energization time and deenergization time of the relay RL differ slightly. To prepare phase signals in consideration of this, two different threshold values may be used for preparation, from the continuous ringing signal, of two separate phase signals respectively for use as the clock signal for energizing the relay and for use as the clock signal for deenergizing the relay. However, the relay energization is performed in the nonsignal state of the interrupted ringing signal, and thus there is no need to prepare two sets of phase information.

The interval from the time $t_6$ when the telephone set T is in an off-look state to the time $t_8$ where the relay RL is deenergized is at a maximum close to 50 milliseconds, but this is within the range of time within which the subscriber takès the handset of the telephone off the hook and places it against an ear, so does not present a problem.

In the above-described second embodiment, various modifications are possible. For example, the continuous ringing signal is not limited to a frequency of 20 Hz. Any low frequency, such as 16 Hz, is possible. Further, while the interrupted ringing signal IR is comprised of four phases #0 through #3 in a cycle, other constructions are also possible, for example, in a private branch exchange (PBX), a combination can be obtained of a ringing signal having a short cycle for notification of a ringing from an internal line and a ringing signal having a long cycle for notification of ringing from an external line.

As explained above, according to the second embodiment of the present invention, the ring trip signal is latched in accordance with the first phase signal showing the predetermined phase for each cycle of a continuous ringing signal, whereby a relay is deenergized at the phase where the voltage and current of the A.C. component of the continuous ringing signal are zero, so not only is there a reduction in the noise generated at other circuits adjoining the communication channel at which the ringing signal is sent, but also the service life of the relay can be prolonged.

Note that the logical OR gate 18 in FIG. 10 may be removed in the second embodiment, but the loop signal (silent trip signal) and the ring trip signal may directly be input into the line control processor 81. The essence of the second embodiment resides in the ring trip operation occurring during a bell is ringing.

Third Embodiment

In a third embodiment of the present invention, a fault in the calling signal transmission apparatus is detected by using the additional phase signals RGP1 and RGP3 developed in the above-mentioned second embodiment.

Figure 12:
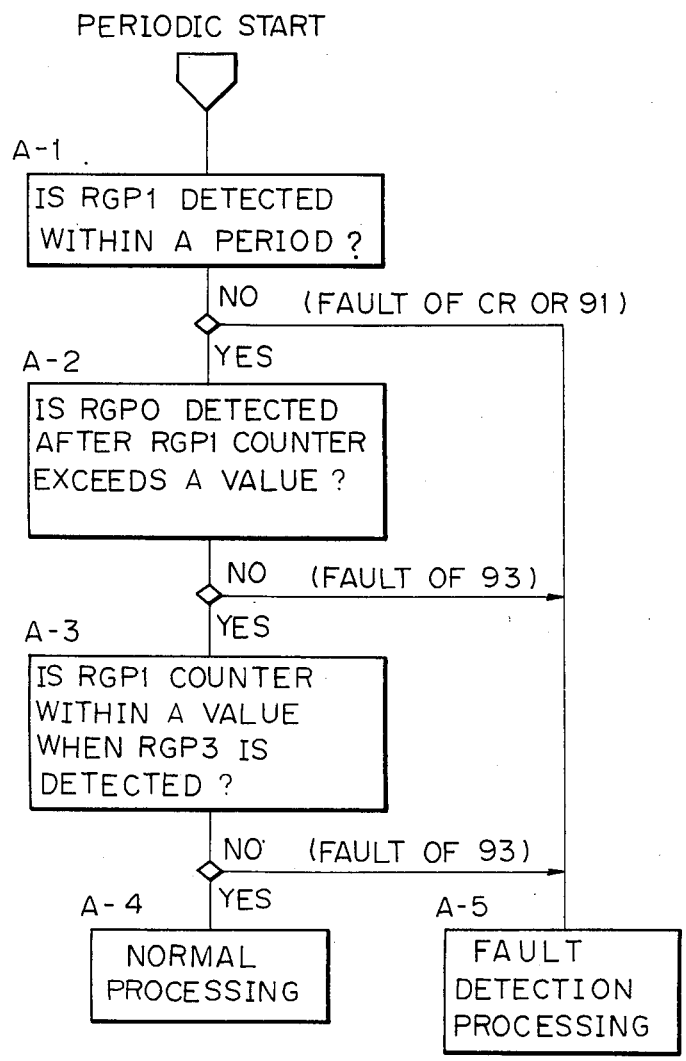
FIG. 12 is a flow chart explaining the principle of a fault detecting method according to the present invention.

The principles of the third embodiment will be explained with reference to FIG. 12 as follows.

That is, according to the third embodiment, the phase signals RGP1 and RGP3, which are one type of additional data RGP1, RGP2, and RGP3 transmitted from the ringing signal generator also referred to as a ringer generator 90, are utilized to detect a fault in the calling signal apparatus. The phase signals RGP1 and RGP3 are used to control relays for sending a calling signal, as described before in the second embodiment.

Of the above-mentioned phase signals, the phase signal RGP1 has a high frequency of for example 20 Hz, and the phase signal RGP3 has a low frequency of for example 0.25 Hz. The phase signals RGP1 and RGP3 are input into the processor 81 in the line circuit. First, at step (A-1), it is discriminated whether or not the phase data RGP1 is detected within a predetermined period of for example 100 milliseconds. When it is not detected, a fault is present in the ringing signal generator, particularly in a continuous ringing signal generator CR or in a Schmitt trigger circuit 91 (FIG. 10B). The ringing signal generator 90, including the continuous ringing signal generator CR and the Schmitt trigger circuit 91, is an optional unit which is mounted or not mounted depending on whether the line circuit is for general purpose terminals or for special purpose terminals. If the ringing signal generator is not mounted on the line circuit for general purpose terminals, a fault is detected by step A-1.

Even when the phase signal RGP1 is detected at the step A-1, fault is detected at a step A-2 when the phase signal RGP3 is not detected even after a counter in the processor for counting the pulses of the phase signal RGP1 exceeds an allowa-ble value. In this case, the timing circuit 93 in the ringing signal generator 90 (FIG. 10B) is recognized as being faulty.

Further, even when the phase signal RGP3 is detected, a fault is detected at step A-3 when the count value of the counter for counting the pulses of the phase data RGP1 is out of the allowable range. In this case also, the timing circuit 93 is recognized as being faulty.

When no fault is detected, normal processing is carried out at a step A-4. When a fault is detected, fault detection processing is carried out at step A-5.

The above-mentioned phase signals RGP1 and RGP3 are originally used, in the above-described second embodiment, to control relays in a calling signal transmitting apparatus. Therefore, according to the third embodiment, it is not necessary to provide any special circuit for detecting a fault because the processor in the line circuit analyzes the phase signals generated by the calling signal transmitting apparatus. Therefore, the increase in installation space and cost can be avoided.

Figure 13:
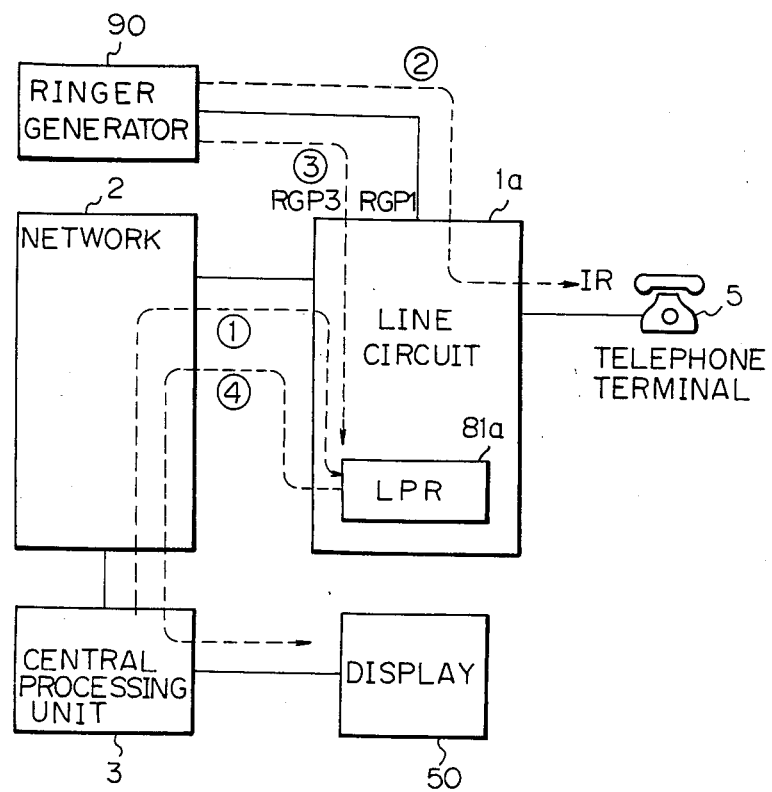
FIG. 13 is a block diagram illustrating a system construction of a telephone exchange system according to another embodiment of the present invention.

FIG. 13 is a block diagram illustrating system construction of a telephone exchange system according to the third embodiment of the present invention. The system shown in FIG. 13 consists of a ringer generator 90, a network 2, a central processing unit 3, a line circuit 1a, a display unit 50, and a telephone terminal (set) 5.

The ringer generator consists of a calling signal transmitting apparatus and transmits an interrupted ringing signal IR and one kind of additional data, i.e., the phase signals RGP1 and RGP3, to the line circuit 1a. The phase signal RGP1 represents a higher-frequency signal, and the phase signal RGP3 represents a lower-frequency signal.

Figure 14:
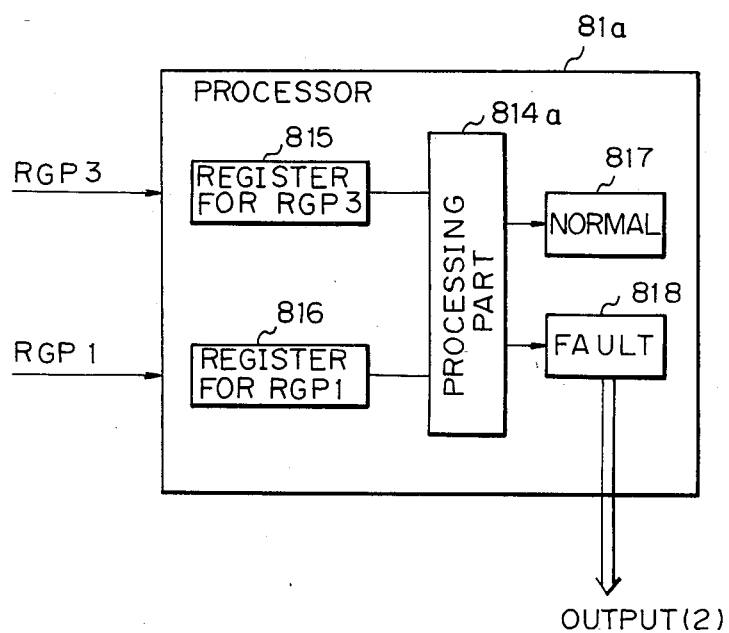
FIG. 14 is a diagram illustrating the construction of the line processor in the system shown in FIG. 13.

The line circuit 1a includes a line processor (LPR) 81a. The above-mentioned line processor 81a includes, as shown in FIG. 14, a register 815 for storing the phase signal RGP3, a register 816 for storing the phase signal RGP1, and a processing part 814a for detecting and processing the additional data. When a fault is detected, it is communicated through the network 2 to the central processing unit 3, whereby the fault is displayed at the display unit 50.

The phase signal RGP1 has a frequency of for example 20 Hz. By counting the pulses of the phase signal RGP1, it is acknowledged that the phase signal RGP3 is output correctly at a 4-second interval from the ringer generator 90 (see FIG. 11B and 11E). When a fault occurs in the ringer generator 90, the phase signal RGP1 or RGP3 is disturbed, resulting in noncoincidence of the counted result.

In the following, the operation of the fault detecting system utilizing the phase signals RGP1 and RGP3 according to the third embodiment of the present invention will be described with reference to FIGS. 13 and 15.

First, referring to FIG. 13, in response to the control signals from the central processing unit 3 through the path ① to the processor 81a in the line circuit 1a, the ringer generator 90 transmits the interrupted ringing signal IR through the path ② and the line circuit 1a to the telephone terminal 5.

Simultaneously, the phase signals RGP1 and RGP3 are sent through the path ③ to the processor 81a. The processing path 814a (FIG. 14) in the processor 81a discriminates whether or not a fault is generated in the ringer generator 90.

Figure 15B:
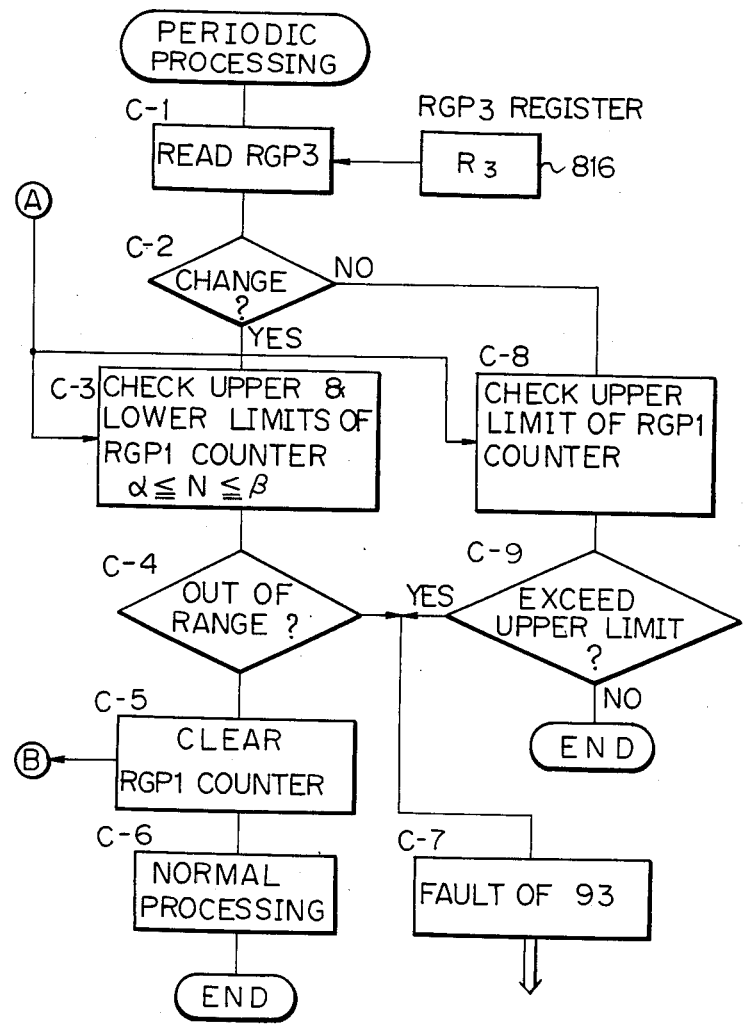
FIG. 15 including 15A and 15B, is a flow chart explaining the embodiment shown in FIG. 14.

As shown in FIG. 15, at a step B-1, the processor 81a supervises the first phase signal RGP1 by reading RGP1 from the register 816 for the RGP1. When RGP1 is not detected during a predetermined period, it is determined, in steps B-2, B-3, B-4, and B-5, that a fault is present in the continuous ringing signal generator CR or in the Schmitt trigger circuit 91. In this fault, the case when the ringer generator 90, including the continuous ringing signal generator CR and the Schmitt trigger circuit 91, is not mounted is included.

When the phase signal RGP1 is detected at a step B-2, the counter for counting up the pulses of the RGP1 is updated at a step B-6. Then, at a step B-7, a time counter is cleared.

On the other hand, the line processor 81a supervises the third phase signal RGP3. At a step C-1, the processing part 814a reads the RGP3 from the register 815 for the RGP3.

At a step C-2, a discrimination is made whether or not a pulse of the RGP3 is received by the processing part 814a. That is, it is checked whether or not the phase signal RGP3 changes its state.

When a change is detected, then, at steps C-3 and C-4, the count value N of a counter for counting the pulses of the phase signal RGP1 is checked as to whether or not the count value N is within an allowable range between a lower limit α and an upper limit β. If the count value N is within the allowable range, the counter for the RGP is cleared at a step C-5 and normal processing is carried out at a step C-6. In this case, the ringer generator 90 is determined as being normal. en the periodic processing is repeated. At the step C-4, if the count value is out of the allowable range, it is determined, at a step C-7, that a fault is p-esent in the timing circuit 93 (FIG. 10B) in the ringer generator 90.

At the step C-2, when no change is detected in the phase signal RGP3, then, at steps C-8 and C-9; it is checked whether or not the count value of the counter for the RGP3 exceeds the upper limit β. If the count value exceeds the upper limit β, it is determined, at the step C-7, that a fault is present in the timing circuit 93. If the count value does not exceed the upper limit β, the periodic processing is again repeated.

When the frequency of the continuous ringing signal CR is 20 Hz, the count value of the counter for the RGP1 in 200 for four seconds between adjacent pulses of the RGP3. In this case, the above-mentioned lower limit α is, for example, 190, and the upper limit β is, for example, 210. The allowable range is determined in accordance with the precision of the clock signal for the processor 1. The periodic process is executed every 10 milliseconds.

From the foregoing description of the third embodiment, it will be apparent that, according to the third embodiment of the present invention, since the processor in the line circuit analyzes the additional data such as the phase signals generated by the calling signal transmission apparatus to detect a fault, no special circuit for detecting a fault is necessary. Therefore, a fault in the calling signal output equipment can be detected without increasing the installation space and cost.

Fourth Embodiment

Now fourth embodiment of the present invention will be described. The fourth embodiment relates to the ring trip detecting circuit 14 shown as a block in FIGS. 2, 3, and 10.

Figure 16:
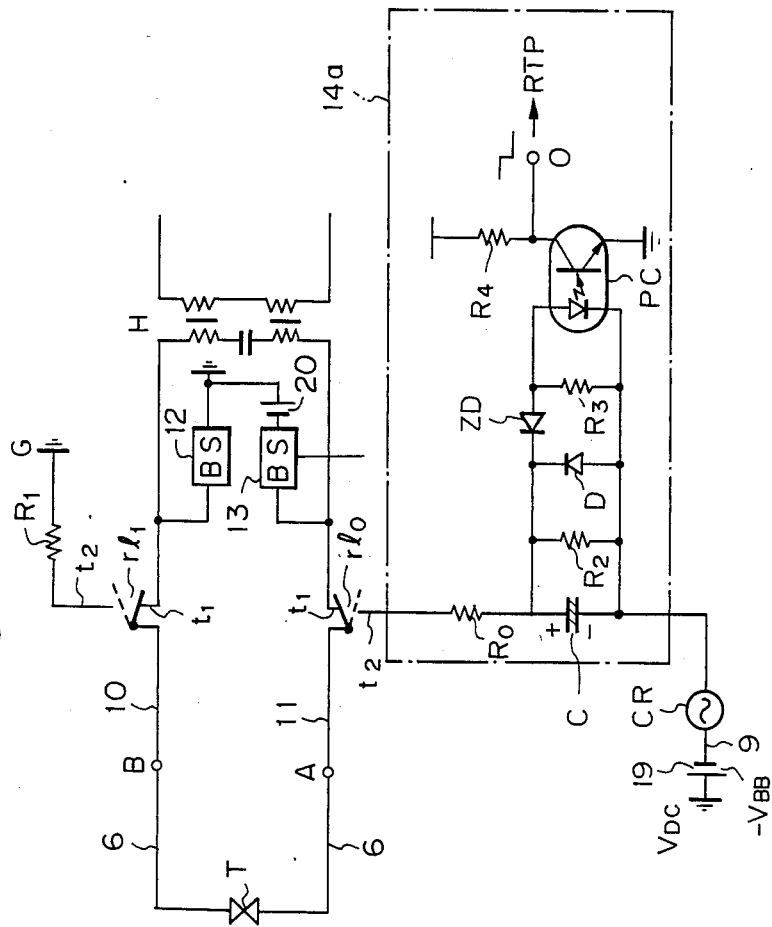
FIG. 16 is a circuit diagram showing an example of a conventional ring trip detecting circuit in place of the ring trip detecting circuit 14 shown in FIG. 4.

FIG. 16 is a circuit diagram showing an example of a conventional ring trip detecting circuit in place of the ring trip detecting circuit 14 provided in the line circuit 1 shown in FIG. 3. In the figure, elements the same as in FIG. 3 are indicated with the same reference numerals or characters. FIG. 16 shows a conventional ring trip detecting circuit 14a.

When a signal is received for the telephone T, the afore-mentioned relay RL is operated and the contacts $rl_0$ and $rl_1$ thereof changed from a terminal t1 to t2.

Then, the afore-mentioned continuous ringing signal CR is sent to the telephone T4.

Figure 17:
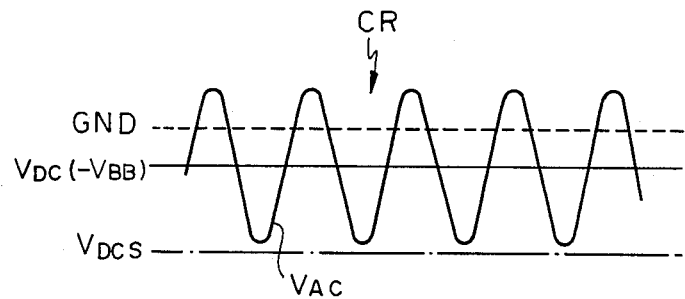
FIG. 17 is a waveform diagram of the continuous ringing signal CR.

FIG. 17 is a waveform diagram of the continuous ringing signal CR. The ringing signal CR superimposes on a direct current voltage $V_{DC} = -V_{BB}$ (for example, $-48$ V) an alternating current voltage $V_{AC}$ having an effective voltage of, for example, 95 V (rms), and a frequency of 20 Hz.

Returning to FIG. 16, the alternating current component ($V_{AC}$) of the signal CR passes through a capacitor C and a ringing signal detecting resistor $R_0$ and operates the bell in the telephone set T. When the subscriber takes the receiver off the hook, the impedance in the telephone set T is lowered so that the bell ceases to ring and a direct current loop is formed. This means that the capacitor C is charged with the illustrated polarity (+, −) by the direct current voltage $V_{DC}$. When this charging voltage rises and exceeds the Zener voltage of a Zener diode ZD, a photodiode in a photocoupler PC lights up and the phototransistor of the pair turns ON. This ON state results in the output voltage of the photocoupler PC at an output terminal 0 connected to an output resistor R4 falling to the ground level. At the output terminal 0, the ring trip signal RTP is obtained. When the signal RTP is detected by the previously mentioned scanning by the line control processor 8, 81 or 81a (FIG. 3, FIG. 10 or FIG. 14), the central control unit (CC) 3 (FIG. 1) cuts off the transmission of the signal CR and starts the exchange connect processing of the network (NW) 2 (FIG. 1). In FIG. 16, a resistor $R_2$ is the discharge resistor for the capacitor C, a resistor $R_3$ the protective resistor for the photodiode in the photocoupler PC, and a diode D is for protection of the photodiode from inverse bias.

In the conventional ring trip detecting circuit shown in FIG. 16, particular problems are posed by the existence of the capacitor C. If the capacitor C could be removed, the various problems caused by the conventional ring trip detecting circuit 14a could be eliminated in one stroke.

The first problem is that the capacitor C usually requires a large capacitance, for example, 47 microfarads, enlarging the external dimensions of the ring trip detecting circuit, which is a disadvantage in mounting. The capacitor C is provided for every line circuit (LC) 1, the numbers of which can become tremendous, so the dimensions should be as small as possible.

The second problem is that the capacitor C takes a long time to become charged. The ring trip signal RTP is transmitted after the charge up of the capacitor C. Thus, a relatively long time is required until the generation of the ring trip signal RTP. This time is proportional to the capacitance (47 microfarads) of the capacitor C, and thus considerable time passes from when the receiver is taken off the hook until the exchange connection, ion is made, making a swift response impossible.

The third problem is that the capacitor C cannot receive ringing signals of specifications severer than the ringing signal CR of the specifications shown in FIG. 17. The ringing signals of the severer specification are used for special services. If the direct current voltage $V_{DC}$ forming the signal CR of FIG. 17 exceeds $-48$ V by a large margin, it would be necessary to either greatly increase the withstand voltage of the capacitor C or else provide some sort of protective means in addition to the same. A specific example of such a case is a waiting call service used in, for example, a hotel. This service indicates a call, i.e., an incoming signal, received during the absence of the subscriber by flickering a discharge lamp (neon tube). To light up the neon tube, another direct current voltage $V_{DCS}$ of $-100$ V, far exceeding $-48$ V, is used.

Figure 18:
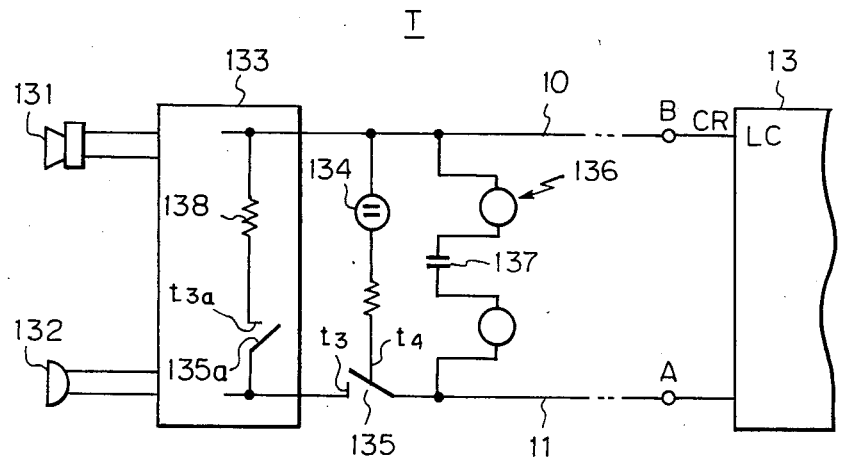
FIG. 18 is a circuit diagram showing an example of the conventional structure in the telephone T shown in FIGS. 1, 3, 10, or 12.

FIG. 18 is a circuit diagram showing an example of the conventional structure in the telephone T shown in FIGS. 1, 3, 10, or 16. In the figure, 131 is a transmitter and 132 a receiver, constituting a handset of the telephone set T, and is driven by a usual telephone circuit 133. Reference numeral 136 is a normal bell circuit and has a direct current prevention capacitor 137. When the receiver transmitter (131, 132) is picked up, a hook switch 135 turns ON to connect the channel 11 to a terminal $t_3$. This hook switch 135 has connected to it the neon tube 134. To notify the subscriber of a signal which has come in during an absence, a special service direct current voltage $V_{DCS}$ ($-100$V) is transmitted to the telephone set T during each one of the four phases #0 through #3 (FIG. 9C).

According to the fourth embodiment of the present invention, a new and improved ring trip circuit is provided which can eliminate the above-mentioned problems simultaneously. Specifically speaking, the object is to provide a new ring trip detecting circuit achieving functions equivalent to the conventional ring trip circuit 14a without the use of the capacitor C, reducing the external dimensions and shortening the response time of the ring trip, and also making it suitable for the above-mentioned waiting call and other special services.

Figure 19:
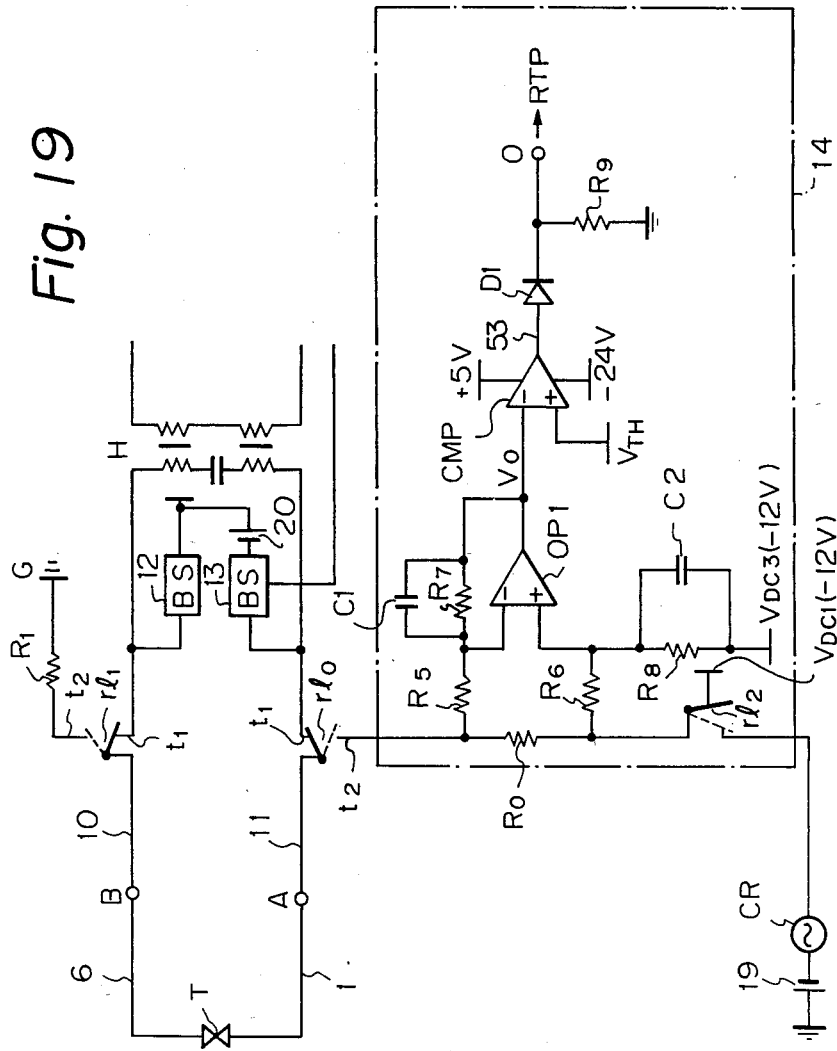
FIG. 19 is a circuit diagram showing in more detail the ring trip detecting circuit shown in FIG. 4 according to a third embodiment of the present invention.

FIG. 19 is a circuit diagram showing in more detail the ring trip detecting circuit 14 shown in FIG. 4, according to the third embodiment of the present invention. In FIG. 19, the ring trip detecting circuit 14 includes a second relay contact rl$_2$ and the ringing signal detecting resistor $R_0$ connected in series between the continuous ringing signal oscillator CR and the first relay contact rl$_0$, an operational amplifier OP1, a comparator CMP, a resistor R5 connected between the inverted input of the operational amplifier OP1 and one end of the resistor $R_0$, a resistor R6 connected between the noninverted input of the operational amplifier OP1 and the other end of the resistor $R_0$, a resistor R7 connected between the inverted input and the output of the operational amplifier OP1, a capacitor C1 connected in parallel with the resistor R7, a resistor R8 and a capacitor C2 connected in parallel between the noninverted input of the operational amplifier OP1 and a power supply $V_{DC3}$ of, for example, $-12$ V, a diode D1 connected between the output of the comparator CMP and the output end 0 of the circuit 14, and a resistor R9 connected between the output end 0 and the power supply of $-V_{BB}$ ($-48$ V).

The operation of the circuit 19 is as follows. First, the line control processor 8 or 81 (FIG. 3, FIG. 9) upon an incoming signal for the telephone set T, operates the relay RL (FIG. 3, FIG. 9) to drive the relay contacts rl$_0$ and rl$_1$ and connect the terminals t1 to the terminals t$_2$. At the same time, it sends the ringing signal CR to the telephone set T. This signal CR follows the path of the second contact rl$_2$ linked with the first contact rl, the ringing signal detecting resistor $R_0$, the first contact rl0, the line 11, the telephone set T, the line 10, the contact rl1, the resistor $R_1$ and the ground. Thus, the bell circuit 136 (FIG. 18) is driven and the bell is rung by the alternating current voltage $V_{AC}$ in the signal CR. In this case, the telephone set T is in the on-hook state, so the contact of the hook switch 135 (Fig 18) is turned to the terminal t4 side and the signal CR passes through only the bell circuit 136 (FIG. 18). The bell circuit 136 is usually expressed as equivalent to a series circuit of a coil, a capacitor, and a resistor and has a high impedance of 7 to 8 kilohms with when driven by an alternating current voltage $V_{AC}$ of 20 Hz. For this reason, the signal CR (alternating current signal) passing through the second contact rl2, the ringing signal detecting resistor $R_0$, and the first contacts rl0 and rl1 is, for example, as small as 10 to 20 mA. When this alternating current signal is made as small as 10 mA, the voltage appearing at both ends of the ringing signal detecting resistor $R_0$ having a resistance of, for example, 820 ohms, is 8.2 V (10 mA×820 ohms). Now, since the telephone set T is in an on-hook state, the output voltage $V_0$ of the operational amplifier OP1 must not exceed the threshold voltage applied to the noninverted input of the comparator CMP. Note, if the output voltage $V_0$ exceeds the threshold voltage $V_{TH}$, the output of the comparator CMP would become "H" (high) level and the ring trip signal RTP would be transmitted. To ensure that the voltage $V_0$ is lower than $V_{TH}$ during the on hook state the above-mentioned alternating current voltage 8.2 V is suppressed in the on-hook state and the operational amplifier OP1 made so as not output a voltage higher than $V_{TH}$, i.e., the ring trip signal RTP is made so as not to be transmitted, by the provision of an alternating current component suppression unit for the signal CR connected in parallel with the operational amplifier OP1. This alternating current component suppression unit is, specifically, a low-pass filter and is realized by an integration circuit. The resistor R5 and the capacitor C1 in FIG. 19 form this integration circuit. If the resistor R5 is made, for example, 100 kilohms, the capacitor C1 may be about 3.3 microfarads. Here, the output voltage $V_0$ of the operational amplifier OP1 is expressed by:

$$V_0 = \frac{Z_{C1}}{\sqrt{(R_5)^2 + (Z_{C1})^2}} \times 8.2 \text{ V}$$

where, R5 is the resistance of the resistor R5, and $Z_{C1}$ is the impedance to the alternating current component (20 Hz) of the capacitor C1. If the above-mentioned sample figures are used for R4 and C1, then R5=100 kilohms, $$Z_{C1} = \frac{1}{2\pi \times 20 \times 3.3 \times 10^{-6}} = 2.4 \text{ kilohms,}$$

and $V_0$ would become approximately 0.2 V. Therefore, for the alternating current component of the ringing signal CR, the output of the above-mentioned voltage (=8.2 V) generated at the input side of the operational amplifier OP1 can be suppressed to 0.2 V. In summary, the ring trip detecting circuit 14 shqwn in FIG. 19 does not respond at all to the ringing signal CR and does not output a ring trip signal RTP in the on-hook state. Note, to use the operational amplifier OP1 as a differential amplifier, a resistor R6, and capacitor C2 of the same construction as the above-mentioned integration circuit (R5, C1) are provided. Therefore, the resistance of the resistor R6 and the capacitance of the capacitor C2 are also 100 kilohms and 3.3 microfarads, respectively.

Next, assume that a subscriber responds to a call and thus the telephone set T is in an off-hook state. Referring back to FIG. 18, the off-hook operation results in the contact of the hook switch 135 of FIG. 18 changing from the terminal t4 to t3. Accordingly the bell circuit 136 enters the nonexcitation state and the ringing of the bell stops. Further, at this time, a hook switch 135a in the telephone circuit 133 acts together with the hook switch 135 and connects the contact to the terminal t3a side, so a closed loop including a resistor 138 is formed. As a result, not only the alternating current signal ($V_{AC}$) of the ringing signal CR, but also the direct current component ($V_{DC}$) of the signal CR begins to flow.

In FIG. 19, the direct current due to the direct current component creates a direct current voltage V (R0) at both ends of the ringing signal detecting resistor R0. This direct current voltage V (R0) initially appears at the output of the operational amplifier OPI as a voltage $$V_0 = V (R0) \times \frac{R7}{R5},$$

where R5 and R7 respectively represent the resistances of the resistors R5 and R7. Assume that the resistance R5 is equal to the resistance R7. Then, the initial voltage $V_0$ becomes equal to the voltage V(R0). In this case, the inverted input (−) side of the operational amplifier OP1 becomes higher in potential than the noninverted input (+) side which is connected through the resistor R8 to a power suppl $V_{DC3}$ of, for example, −12V, so the output voltage $V_0$ of the operational amplifier OP1 falls. However, the above-mentioned capacitor C1 is connected in parallel to the resistor R7, so the output voltage $V_0$ does not rapidly fall but of falls gradually with a certain time constant.

FIGS. 20A–20C are waveform diagrams showing the signal waveforms of key parts in FIG. 19. In FIG. 20A, the above-mentioned gradually falling output $V_0$ is shown. The output $V_0$ gradually falls overall from the off-hook time $T_{OFF}$. An analysis of the output voltage $V_0$ shows that it is composed of the direct current component $V_{DC}$ and the alternating current component $V_{AC}$, $V_{AC}$ being the alternating current signal of 20 Hz comprising the above-mentioned continuous ringing signal CR and being superimposed on $V_{DC}$. Therefore, as $V_{DC}$ gradually falls due to the capacitor C1, $V_{AC}$ also falls at the same time. After the time $T_{OFF}$, the amplitude of $V_{AC}$ rapidly increases, as is clear from the circuit construction of the telephone set T shown in FIG. 18. Referring to FIG. 18, when the hook switch 135 is in the on-hook state, the whole of the alternating current signal ($V_{AC}$) in the signal CR is applied to the bell circuit 136 so that it has a relatively small amplitude. This is because, as mentioned before, the impedance of the bell circuit 136, which comprises the equivalent of a coil, capacitor, and a resistor in a series circuit, with the alternating current signal (20 Hz) usually reaches 7 to 8 kilohms. However, when hook switches 135 and 135a are turned to the off-hook state (after $T_{OFF}$ in FIG. 16A), the contacts of the hook switches 135 and 135a change to the terminals t3 and t3a, and the impedance to the 20 Hz alternating current signal comes only from the resistor 138. The resistance of the resistor 138 is usually about 300 ohms, which is extremely small compared with the above-mentioned impedance (7 to 8 kilohms) of the bell circuit 136. This is why the amplitude of the alternating current component $V_{AC}$ of FIG. 16A becomes larger after $T_{OFF}$. On the other hand, after turning the hook switches 135 and 135a to the off-hook state, the direct current component in the signal CR increases largely, i.e., later than the leakage current flowing, during an on-state of the hook switches, through leakage resistance in the telephone set T. The increased direct current flowing through the ringing signal detecting resistor R0 increases the voltage applied to the inverted input of the operational amplifier OP1, so that direct current voltage component $V_{DC}$ in the output voltage $V_0$ of the operational amplifier OP1 gradually falls after $T_{OFF}$ as shown in FIG. 20A.

Returning to FIG. 20A, the falling output voltage $V_0$ cuts across the threshold level $V_{TH}$ at time $T_0$. This threshold level $V_{TH}$ is the comparative reference input of the comparator CMP of FIG. 15 and is used for the level comparison with $V_0$ applied to its other input. As shown in FIGS. 20A and 20B, when $V_0 < V_{TH}$, the output of the comparator CMP inverts to the "H" level. This "H" level output becomes the desired ring trip signal RTP through the diode D1. The resistor R9 is the pull-down resistor. Therefore, the ring trip detecting circuit 14 of the third embodiment can output the ring trip signal RTP without using the conventional capacitor C (FIG. 16). As a result, the first problem mentioned above can be resolved. Although the capacitors C1 and C2 (FIG. 19) are newly required, however, these may all have capacitances of several microfarads and do not require the large capacitance of 47 microfarads as with the conventional capacitor C. Further, the ring trip detecting circuit 14 of the third embodiment can shorten the time from when the receiver is taken off the hook until the output of the signal RTP and so can solve the second problem mentioned above. This is clear from FIG. 20A. That is, while the direct current component $V_{DC}$ gradually falls toward the threshold level $V_{TH}$, the alternating current component $V_{AC}$ superimposed on this increases in amplitude after the off-hook time $T_{OFF}$, and thus already cuts across the level $V_{TH}$ at time $T_0$ (FIG. 16A). That is, after $T_{OFF}$, the ring trip singal RTP is output in a short time.

The conventional ring trip detecting circuit 14a shown in FIG. 16 is electrically floated from the power supply by means of the photocoupler PC. Therefore, the conventional ring trip detecting circuit 14a consumes a small electric power. On the contrary, in the ring trip detecting circuit 14 shown in FIG. 19, since active circuits such as the operating amplifiers OP1 and comparator CMP are employed, this is accompanied by an unnecessary loss of both alternating current power and direct current power in the ring trip detection circuit 14 because these active circuits are directly connected to power supplies. Therefore, the second relay contact rl2 (FIG. 19) is provided. At times other than incoming signals, said relay contact rl2 is preferably switched to a power suppl $V_{DC1}$ of $-12$ V for example.

Fifth Embodiment

Next, an explanation regarding the above-mentioned third problem point will be given with reference to FIG. 21. FIG. 21 is a circuit diagram showing a ring trip detecting circuit according to a fifth embodiment of the present invention. The ring trip detecting circuit 14b resolves the third problem as well as the above-mentioned first and second problems. The ring trip detecting circuit 14b of the fifth embodiment is useful for the above-mentioned message waiting and other special services. Therefore, for installation of telephone sets in hotels, etc., requiring such special services, the ring trip circuit 14b of the fourth embodiment should be employed. The fifth embodiment differs from the fourth embodiment in the addition of a level suppression means comprised of a clamping resistor R10 connected between the noninverted input and the inverted input of the operational amplifier OP1, and a clamping diode D2 whose cathode is connected to the noninverted input of the operational amplifier OP1 and whose anode is connected to a power supply $V_{DC4}$ of $-22$V. Except for the above-mentioned resister R10 and the diode D2, the circuit shown in FIG. 21 basically has the same operating principle as the third embodiment shown in FIG. 19. In other words, in normal cases when a callee is present at the telephone set T, it receives the continuous ringing signal CR, in accordance with the signal changes shown in FIG. 19, outputs the ring trip signal RTP in response to an off-hook operation. However, when this ring trip signal RTP is not output, i.e., when the called party is absent, the central control unit (CC) 3 (FIG. 1) issues a command for execution of the waiting call service. That is, when the message waiting service is executed a neon tube 134 (FIG. 18) attached to the telephone set T is continually flashed to inform the called party that a signal was received during an absence. Note, if there is another call during this period, a normal calling processing is executed. That is, a calling tone is sent back to the calling party, and on the other hand, the continuous ringing signal CR is transmitted to the called party. Then, after completion of the communication or after the handset is replaced on the telephone set by the calling party when the called party is still absent, the neon tube 134 is again flashed to show that the waiting call service is being executed.

In this message waiting service, the special service direct current voltage $V_{DCS}(-100V)$ is used in, for example, one of four phases #0 through #3 of the intermittent and interrupted ringing signal (FIG. 9C, FIG. 9D), so consideration must the given to the protection of the operational amplifier OP1 and the prevention of erroneous transmission of the ring trip signal by the operational amplifier OP1. This is because, in general, if the input voltage of an operational amplifier OP1 exceeds its power source voltage (for example, $+5$V and $-24$V) by a large degree, the operational amplifier OP1 would become unstable in output and, in the worst case, break down. Erroneous transmission of a ring trip signal is caused by this unstable output, but erroneous transmission also can be caused by other factors (discussed later). Referring to FIG. 21, first, $V_{DCS}(=-100V)$ is applied in place of the signal CR. This being done, if the additional resistor R10 and diode D2 are not provided a direct current voltage of about $-56$V is applied to the noninverted input of the operational amplifier OP1 through the resistor R6. As a result, the operational amplifier OP1 is destroyed or the output becomes unstable. Here, first, the clamping diode D2 is provided, with one end being supplied with $-22$V, as shown in the figure. Accordingly, the potential of the noninverted input of the operational amplifier OP1 is clamped at roughly $-22.6$V which is a safely voltage in view of the power supply voltage $V_{DCS}$ of $-24$V of the operational amplifier OP1. Also, by the provision of the resistor R10, the voltage between the inverted and noninverted inputs of the operational amplifier OP1 is limited to the voltage V(R10), which is the voltage across the both ends of the resistor R10 and is designed to be smaller than 1V. As a result, destruction of the operational amplifier OP1 can be avoided or instability of the output can be eliminated. When several milliseconds elapse after the arrival of $V_{DCS}$ the input (+, −) of the operational amplifier OP1 become roughly equal in potential due to a so-called imaginary short-circuit, so after a few milliseconds from the arrival of the voltage $V_{DCS}$, the state is equivalent to one where there is no resisto R10. As a result, the ring trip detecting circuit 14b of the fourth embodiment can be used even for waiting calls and other services.

Note, in order to effect the above-mentioned waiting call service, the ringing signal generator 9 shown in FIG. 1 is realized by the circuit 90b shown in FIG. 21. The ringing signal generating circuit 90b includes, in addition to the power supply 19, the continuous ringing signal oscillator CR, the Schmitt trigger circuit 91 (FIG. 10), and the timing circuit 92 (FIG. 10) for generating the second timing signal RGP2, another relay M for driving a relay contact m3, and a counter 97.

The counter 97 generates a carrier pulse after counting, for example, three seconds, from the time of receiving a pulse of the second timing signal RGP2. The relay M is energized by the carrier pulse from the counter 97 to drive the relay contact rl3. Thus, in phase #3, the direct current voltage of −100V from the power supply $V_{DCS}$ is applied to the telephone set T so that the neon tube 134 flashes.

As is apparent from the foregoing explanations, according to the present invention, in a calling signal transmission apparatus of a time-division switching equipment, a logical sum of a silent trip signal and a ring trip signal is input into a line control processor, and a ring trip operation is effected by software processing in the control processor, whereby low cost ring trip equipment in which the number of parts is decreased in comparison with prior art can be provided. Also, for an off-hook state caused by a subscriber error after lifting the handset off the hook or for deenergization of a relay by an error operation due to noise, the bell is again made to ring. Therefore, ring trip equipment can be obtained in which the tolerance against error operations is improved.

Further, an advantage is also obtained in that the problem of the time delay of ring trip operation by conventional software can be resolved by the software in the control processor according to the present invention.

Further, according to the present invention, the ring trip signal is latched in accordance with phase signals showing the predetermined phase for each cycle of a continuous ringing signal, whereby a relay is restored at the phase where the voltage and current of the A.C. component of the ringing signal are zero, so not only is there a reduction in the noise generated at other circuits adjoining the conversation line at which the ringing signal is sent, but also the service life of the relay can be prolonged.

Still further, according to the present invention, a fault in the calling signal transmission apparatus can be detected without providing a special fault detecting device. Therefore, an increase of the installation space and cost can be avoided.

Still further, the present invention can resolve the three problems due to a large capacitor mentioned above and can realize a ring trip circuit with a more compact circuit, faster ring trip, and higher reliability operation.

We claim:

1. A calling signal transmitting apparatus, comprising:

a communication line connected to a telephone set;

continuous ringing signal generating means for generating a continuous ringing signal;

switching means operatively connected between said communication line and said continuous ringing signal generating means, for interrupting said continuous ringing signal;

switch control means, operatively connected to said switching means, for changing said continuous ringing signal into an intermittent ringing signal and for transmitting said intermittent ringing signal to said communication line, by controlling said switching means, said intermittent ringing signal including a signalling period and a no-signal period;

loop detecting means, operatively connected to said communication line, for detecting an off-hook state of said telephone set during the no-signal period in said intermittent ringing signal and producing an output;

ring trip detecting means, operatively connected to said communication line, for detecting an off-hook state of said telephone set during the signalling period in said intermittent ringing signal and producing an output; and logical OR gate means, operatively connected to said loop detecting means, said ring trip detecting means and said switch control means, for inputting into said switch control means, a status signal comprising a logical sum of the output of said loop detecting means and the output of said ring trip detecting means, wherein said switch control means comprises means for resetting, when said status signal represents an off-hook state, said switching means to stop the supplying of said intermittent ringing signal to said communication line, and wherein said switch control means further comprises means for supervising said status signal from said logical OR gate means at a predetermined time interval, and after the reset of said switching means, when said status signal represents an on-hook state of said telephone set after a predetermined number of the supervisions, said switching means is activated again to supply said intermittent ringing signal to said communication line.

2. A calling signal transmitting apparatus as set forth in claim 1, wherein:

said continuous ringing signal having a voltage level is superimposed on a direct current voltage;

said switching means comprises a ringing signal transmitting relay; and said switch control means comprises relay deenergizing control means for deenergizing said ringing signal transmitting relay when the voltage level of said continuous ringing signal crosses the level of said direct current voltage immediately after a ring trip signal is detected by said ring trip detecting means.

3. A calling signal transmitting apparatus as set forth in claim 2, further comprising:

interrupted ringing signal generating means, operatively connected between said continuous ringing signal generating means and said switching means, for generating an interrupted ringing signal having a predetermined number of repeated phases, each phase comprising a no-signal state and a signal state, said signalling period in said intermittent ringing signal being formed by one of said repeated ringing phases and said no-signal period in said intermittent ringing signal being formed by the remaining phases of said repeated phases, said switch control means energizing and deenergizing said ringing signal transmitting relay to operated and restored states, if necessary upon said no-signal state and said signal state, respectively, of said interrupted ringing signal during an on-hook state of said telephone set to control the transmission of said one of said repeated phases of said interrupted ringing signal;

phase signal generating means, operatively connected to said continuous ringing signal generating means, for generating a phase signal representing a predetermined phase angle of each of said repeated phases of said interrupted ringing signal; and latching means, operatively connected to said ring trip detecting means and between said phase signal generating means and said ringing signal transmission relay, for latching a ring trip signal generated from said ring trip detecting means in response to an off-hook operation of said telephone set, and for outputting a relay driving signal in response to said phase signal immediately after the latching of said ring trip signal, whereby said ringing signal transmitting relay is deenergized at a crossing point of the levels of said continuous ringing signal and said direct current voltage.

4. A calling signal transmitting apparatus as set forth in claim 3, further comprising:

phase-data supervising means, operatively connected to said phase signal generating means and included in said phase signal generating means and included in said switch control means, for supervising said phase signal; and fault-detecting means, operatively connected to said phase-data supervising means and included in said switch control means, for detecting a fault in said calling signal transmitting apparatus by detecting whether said phase signal is received by said switch control means.

5. A calling signal transmitting apparatus as set forth in claim 4, wherein said phase data comprises a higher-frequency signal and a lower-frequency signal lower in frequency than said higher-frequency signal, a fault occurring position being identified by detecting whether said higher-frequency signal, said lower-frequency signal or both said higher-frequency and lower-frequency signal are received by said switch control means.

6. A calling signal transmitting apparatus as set forth in claim 3, wherein a phase of said phase signal is advanced from a phase of said continuous ringing signal by a deenergizing time of said ringing signal transmitting relay.

7. A calling signal transmitting apparatus as set forth in claim 1, wherein said continuous ringing signal comprises an alternating current component superimposed on a direct current component, and said ring trip detecting circuit comprises:

a ringing signal detecting resistor, operatively connected to said switching means, for passing said continuous signal;

alternating current component suppression means, operatively connected to said ringing signal detecting resistor, for selectively suppressing signal changes in said continuous ringing signal based on said alternating current component appearing at said ringing signal detecting resistor; and detection means, operatively connected to said ringing signal detecting resistor, for selectively detecting changes in said direct current component from changes in said continuous ringing signal appearing at said ringing signal detecting resistor through said off-hook operation.

8. A calling signal transmitting apparatus as set forth in claim 7, said detection means comprises an operational amplifier using as first and second inputs a voltage appearing across both ends of said ringing signal detecting resistor and having an output.

9. A calling signal transmitting apparatus as set forth in claim 8, wherein said alternating current component suppression means comprises an integrator connected to said ringing signal detecting resistor.

10. A calling signal transmitting apparatus as set forth in claim 8, further comprising:

a first resistor connected between the first input of said operational amplifier and one end of said ringing signal detecting resistor;

a first capacitor connected between the first input and the output of said operational amplifier; and a second resistor connected in parallel with said first capacitor and selectively extracting said direct current component along with said first resistor, said first resistor and said first capacitor forming an integration circuit.

11. A calling signal transmitting apparatus, comprising:

a communication line connected to a telephone set;

continuous ringing signal generating means for generating a continuous ringing signal;

switching means operatively connected between said communication line and said continuous ringing signal generating means, for interrupting said continuous ringing signal;

switch control means, operatively connected to said switching means, for changing said continuous ringing signal into an intermittent ringing signal and for transmitting said intermittent ringing signal to said communication line, by controlling said switching means, said intermittent ringing signal including a signalling period and a no-signal period;

loop detecting means, operatively connected to said communication line, for detecting an off-hook state of said telephone set during the no-signal period in said intermittent ringing signal and producing an output;

ring trip detecting means, operatively connected to said communication line, for detecting an off-hook state of said telephone set during the signalling period in said intermittent ringing signal and producing an output;

logical OR gate mean, operatively connected to said loop detecting means, said ring trip detecting means and said switch control means, for inputting into said switch control means, a status signal comprising a logical sum of the output of said loop detecting means and the output of said ring trip detecting means, wherein said continuous ring signal comprises an alternating current component superimposed on a direct current component;

a ringing signal detecting resistor, operatively connected to said switching means, for passing said continuous signal;

alternating current component suppression means, operatively connected to said ringing signal detecting resistor, for selectively suppressing signal changes in said continuous ringing signal based on said alternating current component appearing at said ringing signal detecting resistor;

detection means, operatively connected to said ringing signal detecting resistor, for selectively detecting changes in said direct current component from changes in said continuous ringing signal appearing at said ringing signal detecting resistor through said off-hook operation, wherein said detection means comprises an operational amplifier using as first and second inputs a voltage appearing across both ends of said ringing signal detecting resistor and having an output;

a first resistor connected between the first input of said operational amplifier and one end of said ringing signal detecting resistor;

a first capacitor connected between the first input and the output of said operational amplifier;

a second resistor connected in parallel with said first capacitor and selectively extracting said direct current component along with said first resistor, said first resistor and said first capacitor forming an integration circuit;

a third resistor connected between the second input of said operational amplifier and the other end of said ringing signal detecting resistor; and a fourth resistor and second capacitor connected in series with said third resistor and mutually connected in parallel, said third resistor, said fourth resistor, and said second capacitor have the same values as said first resistor, said second resistor, and said first capacitor, respectively.

12. A calling transmitting apparatus as set forth in claim 11 wherein the output of said operational amplifier produces an output level and said detection means includes a comparator having a predetermined threshold level, said comparator outputting said ring trip signal when a level inversion occurs between said threshold level and the output level of said operational amplifier.

13. A calling signal transmitting apparatus as set forth in claim 11, further comprising special service performing means, operatively connected to said communication line, for sending a ringing signal comprising a special service direct current component larger than the level of the said direct current component; and level suppression means, operatively connected to said detection means, for suppressing said special service direct current component applied to said detection means to a constant level.

14. A calling signal transmitting apparatus as set forth in claim 13, wherein said level suppression means comprises a clamp diode and a clamp resistor for clamping the input voltage of said detection means to a constant level during execution of said special service.

15. A calling signal transmitting apparatus as set forth in claim 14, wherein said clamp diode is connected to the second input of said operational amplifier, and said clamp resistor is connected between the first and second inputs of said operational amplifier.

16. A calling signal transmitting apparatus as set forth in claim 15, wherein said detection means includes a comparator connected to the output of said operational amplifier and having a predetermined threshold level, said comparator outputting said ring trip signal when a level inversion occurs between said threshold level and the output level of said operational amplifier.

17. A calling signal apparatus, comprising ring trip equipment for supplying a ringing signal, with an alternating current component superimposed on a direct current component, to a telephone over a communication line to drive a bell circuit in said telephone by said alternating current component and for detecting the off-hook state of said telephone when it is taken off the hook to send a ring trip signal, the ring trip equipment comprising:

a ringing signal detecting resistor, connected to the communication line, for passing a continuous ringing signal;

alternating current component suppression means, operatively connected to said ringing signal detecting resistor, for selectively suppressing signal changes in said continuous ringing signal based on said alternating current component appearing at said ringing signal detecting resistor;

detection means, operatively connected to said alternating current suppression means, for selectively detecting changes in said direct current component out of changes in said continuous ringing signal appearing at said ringing signal detecting resistor by an off-hook operation, wherein said detection means comprises an operational amplifier using as first and second inputs the voltage appearing across said ringing signal detecting resistor and having an output;

a first resistor connected between the first input of said operational amplifier and one end of said ringing signal detecting resistor;

a first capacitor connected between the first input and the output of said operational amplifier;

a second resistor connected in parallel with said first capacitor and selectively extracting said direct current component along with said first resistor, said first resistor and said first capacitor forming an integration circuit;

a third resistor connected between the second input of said operational amplifier and the other end of said ringing signal detecting resistor; and a fourth resistor and second capacitor connected inseries with said third resistor and mutually connected in parallel, said third resistor, said fourth resistor, and said second capacitor have the same values as said first resistor, said second resistor, and said first capacitor, respectively.

18. A calling signal transmitting apparatus as set forth in claim 17, wherein the output of said operational amplifier produces an output level and said detection means includes a comparator having a predetermined threshold level, said comparator outputting said ring trip signal when a level inversion occurs between said threshold level and the output level of said operational amplifier.

19. A calling signal transmitting apparatus as set further in claim 17, further comprising special service performing means, operatively connected to the communication line, for sending a ringing signal comprising:

a special service direct current component; and level suppression means, operatively connected to said detection means, for suppressing said special service direct current component applied to said detection means to a constant level.

20. A calling signal transmitting apparatus as set forth in claim 18, wherein said level suppression means comprises a clamp diode and clamp resistor for clamping the input voltage of said detection means to a constant level during execution of said special service.

21. A calling signal transmitting apparatus as set forth in claim 19, wherein said clamp diode is connected to the second input of said operational amplifier, and said clamp resistor is connected between the first and second inputs of said operational amplifier.

22. a calling signal transmitting apparatus as set forth in claim 20, wherein said detection means includes a comparator connected to the output of said operational amplifier and having a predetermined threshold level, said comparator outputting said ring trip signal when a level inversion occurs between said threshold level and the output level of said operational amplifier.

* * * * *

UNITED STATES PATENT AND TRADEMARK OFFICE
CERTIFICATE OF CORRECTION

PATENT NO. : 4,748,659

DATED : May 31, 1988

INVENTOR(S) : Kasahara et al.

It is certified that error appears in the above-identified patent and that said Letters Patent is hereby corrected as shown below:

Column 1, line 51, "restored" should be --restore--.

Column 3, line 21, "informed" should be --transmitted--;

line 53, after "due", insert --to--.

Column 4, line 10, "detection" should be --detecting--.

Column 6, line 61, before "connected", insert --is--;

line 66, "logicalOR" should be --logical OR--.

Column 9, line 16, "restored" should be --restoration--.

Column 10, line 47, delete "35".

Column 11, line 38, "724" should be --824--.

Column 16, line 27, do not start new paragraph;

line 29, do not start new paragraph;

line 58, before "fault", insert --a-- and before "step", delete --a--.

Column 18, line 21, "en" should be --Then--;

line 24, "p-esent" should be --present--.

UNITED STATES PATENT AND TRADEMARK OFFICE
CERTIFICATE OF CORRECTION

PATENT NO. : 4,748,659

DATED : May 31, 1988

INVENTOR(S) : Kasahara et al.

It is certified that error appears in the above-identified patent and that said Letters Patent is hereby corrected as shown below:

Column 21, line 56, "shqwn" should be --shown--.

Column 22, line 27, "suppl" should be --supply--.

Column 23, line 38, "singal" should be --signal--.

Column 24, line 37, "the" (1st occurrence) should be --be--;

line 59, "safely" should be --safe--.

Column 25, line 4, "miilisecond" should be --millisecond--;

line 5, "resisto" should be --resistor--.

Column 28, line 12, after "7,", insert --wherein--.

Column 30, lines 62 and 63, "further" should be --forth--.

Signed and Sealed this

Twenty-fifth Day of October, 1988

Attest:

DONALD J. QUIGG

*Attesting Officer*        *Commissioner of Patents and Trademarks*